(12) United States Patent
Suzuoki et al.

(10) Patent No.: US 11,430,412 B2
(45) Date of Patent: Aug. 30, 2022

(54) FREELY SELECTED POINT OF VIEW IMAGE GENERATING APPARATUS, REFERENCE IMAGE DATA GENERATING APPARATUS, FREELY SELECTED POINT OF VIEW IMAGE GENERATING METHOD, AND REFERENCE IMAGE DATA GENERATING METHOD

(71) Applicant: SONY INTERACTIVE ENTERTAINMENT INC., Tokyo (JP)

(72) Inventors: Masakazu Suzuoki, Tokyo (JP); Yuki Karasawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/770,232

(22) PCT Filed: Dec. 19, 2017

(86) PCT No.: PCT/JP2017/045590
§ 371 (c)(1),
(2) Date: Jun. 5, 2020

(87) PCT Pub. No.: WO2019/123547
PCT Pub. Date: Jun. 27, 2019

(65) Prior Publication Data
US 2021/0193083 A1    Jun. 24, 2021

(51) Int. Cl.
*G09G 5/37* (2006.01)
*G06F 3/01* (2006.01)
(Continued)

(52) U.S. Cl.
CPC ............... *G09G 5/37* (2013.01); *G06F 3/012* (2013.01); *G06T 15/20* (2013.01); *G09G 5/14* (2013.01); *G09G 2354/00* (2013.01)

(58) Field of Classification Search
None
See application file for complete search history.

(56) References Cited

U.S. PATENT DOCUMENTS 6,084,979 A * 7/2000 Kanade ................ H04N 13/243
                                                    382/154
9,521,416 B1 * 12/2016 McMahon ........... H04N 19/132
(Continued)

FOREIGN PATENT DOCUMENTS

| JP | 2002-42158 A | 2/2002 |
| JP | 2003-108985 A | 4/2003 |
| JP | 2011-165081 A | 8/2011 |

OTHER PUBLICATIONS

International Preliminary Report on Patentability dated Jul. 2, 2020, from International Application No. PCT/JP2017,045590, 13 sheets.
(Continued)

*Primary Examiner* — Patrick F Valdez
(74) *Attorney, Agent, or Firm* — Katten Muchin Roseman LLP

(57) ABSTRACT

With respect to a space including an object 40 of a display target, images of the space viewed from reference points 42a to 42c of view are created as reference images 46a, 46b, and 46c in advance and they are synthesized according to a position of an actual point of view to render a display image. In the certain reference image 46b, data other than a part 48 represented only in it is deleted. At the time of rendering of the deleted part, the other reference images 46a and 46c are used.

7 Claims, 22 Drawing Sheets

(51) Int. Cl.
  *G06T 15/20*  (2011.01)
  *G09G 5/14*  (2006.01)

(56) References Cited

U.S. PATENT DOCUMENTS

| | | | |
|---|---|---|---|
| 9,865,077 B2* | 1/2018 | Unger | G06T 19/20 |
| 10,134,004 B1* | 11/2018 | Liberato, Jr. | G06Q 10/087 |
| 2005/0012757 A1* | 1/2005 | Park | G06T 15/205 |
| | | | 345/582 |
| 2013/0321586 A1* | 12/2013 | Kirk | H04N 13/194 |
| | | | 348/47 |
| 2018/0165880 A1* | 6/2018 | Overbeck | H04N 19/597 |
| 2019/0045222 A1* | 2/2019 | Yip | H04N 19/31 |
| 2021/0125399 A1* | 4/2021 | Pystynen | G06T 7/50 |

OTHER PUBLICATIONS

International Search Report and Written Opinion dated Mar. 13, 2018, from International Application No. PCT/JP2017,045590, 9 sheets.

Tomite, Kaname, et al.,"Arbitrary Viewpoint for Rendering from Multiple Omnidirectional Images for Interactive Walkthroughs", ITE Technical Reports, Jan. 30, 2002, vol. 26, No. 9, pp. 65-70.

* cited by examiner (a)  (b)

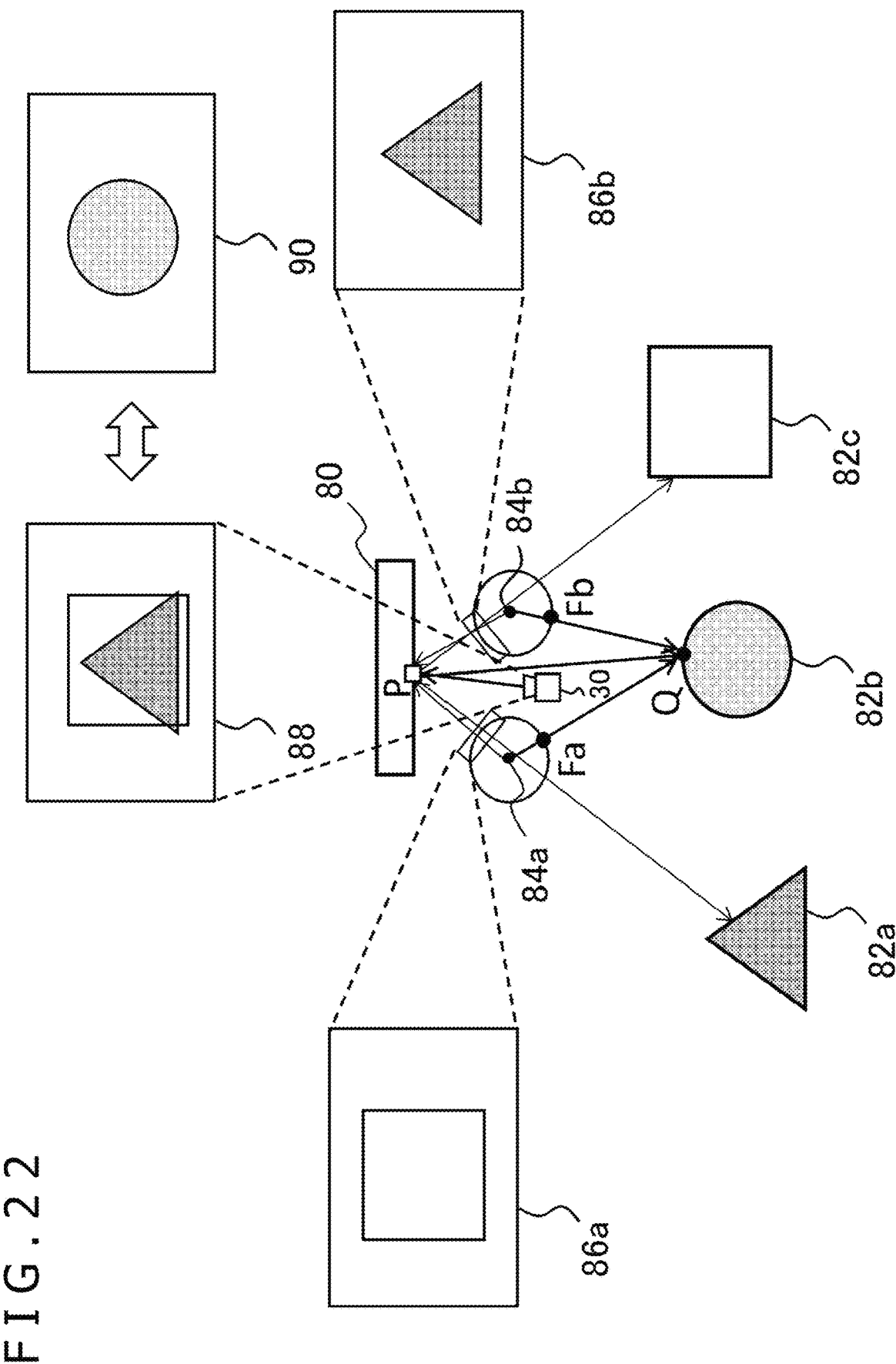
F I G . 2 2

FREELY SELECTED POINT OF VIEW IMAGE GENERATING APPARATUS, REFERENCE IMAGE DATA GENERATING APPARATUS, FREELY SELECTED POINT OF VIEW IMAGE GENERATING METHOD, AND REFERENCE IMAGE DATA GENERATING METHOD

TECHNICAL FIELD

The present invention relates to an image generating apparatus that generates a display image according to a point of view, a reference image data generating apparatus that generates data used for it, and an image generating method and a reference image data generating method implemented in these apparatuses.

BACKGROUND ART

Image display systems with which a target space can be viewed from a free point of view have been spread. For example, a system has been developed in which panorama video is displayed on a head-mounted display and a panorama image according to a direction of a line of sight is displayed when a user who wears the head-mounted display rotates the head. Through using the head-mounted display, it is also possible to enhance a sense of immersion in video and improve operability of an application of a game or the like. Furthermore, a walk-through system has also been developed in which a user who wears a head-mounted display physically moves and thereby can virtually walk around in a space displayed as video.

SUMMARY

Technical Problems

Regardless of the kind of display apparatus, high responsiveness is required in change in displaying in response to motion of the point of view in an image display technique compatible with a free point of view. Meanwhile, to enhance a sense of presence of the image world, the need to enhance the resolution and carry out complex calculation arises and the load of image processing increases. For this reason, it is also possible that displaying does not catch up with movement of the point of view and the sense of presence is impaired as a result.

The present invention is made in view of such problems and an object thereof is to provide a technique that can achieve both responsiveness of image displaying with respect to the point of view and image quality.

Solution to Problems

In order to solve the above-described problems, a certain mode of the present invention relates to an image generating apparatus. The image generating apparatus is characterized by having the following configuration. The image generating apparatus includes a reference image data storing unit that stores data of a reference image that represents an image when a space including an object of a display target is viewed from a predetermined reference point of view, a point-of-view information acquiring unit that acquires information relating to a point of view, a projecting unit that represents a position and a shape of an image of the object when the space is viewed from the point of view on a plane of a display image, a pixel value deciding unit that decides a value of a pixel configuring the image of the object in the display image by using a value of a pixel that represents the same image in the reference image, and an output unit that outputs data of the display image. The reference image data storing unit stores data of a reference image including an invalid region that does not have data of an image in a field of view from a corresponding reference point of view. The pixel value deciding unit selects the reference image in which the same image appears in a valid region when deciding the value of the pixel configuring the image of the object.

Here, the "predetermined reference point of view" is a point of view set in the space in a predetermined number equal to or larger than one with predetermined position coordinates or a predetermined distribution rule, and the number and position thereof may be fixed or may be changed over time according to change that occurs in the space and so forth.

Another mode of the present invention relates to a reference image data generating apparatus. The reference image data generating apparatus is a reference image data generating apparatus that generates data of a reference image that is used for generating an image when a space including an object of a display target is viewed from a freely selected point of view and represents an image when the space is viewed from a predetermined reference point of view. The reference image data generating apparatus includes a reference image rendering unit that renders a plurality of the reference images in a field of view corresponding to a plurality of the reference points of view, a data deleting unit that deletes, when the same point on the object appears in a plurality of the reference images, data of an image of the point from any reference image, and an index data generating unit that generates index data that associates identification information indicating that data has been deleted with a region in which the data has been deleted in the reference image, and outputs the index data in association with data of the reference image.

Further another mode of the present invention relates to an image generating method. The image generating method is an image generating method for generating a display image that represents a space including an object of a display target and is characterized by having the following configuration. The image generating method includes a step of acquiring information relating to a point of view, a step of representing a position and a shape of an image of the object when the space is viewed from the point of view on a plane of the display image, a step of reading out data of a reference image that represents an image when the space is viewed from a predetermined reference point of view from a memory that stores the data of the reference image, and deciding a value of a pixel configuring an image of the object in the display image by using a value of a pixel that represents the same image in the reference image, and a step of outputting data of the display image. The memory stores data of a reference image including an invalid region that does not have data of an image in a field of view from a corresponding reference point of view, and the step of deciding the value of the pixel configuring the image of the object selects the reference image in which the same image appears in a valid region.

Further another mode of the present invention relates to a reference image data generating method. The reference image data generating method is a reference image data generating apparatus that generates data of a reference image that is used for generating an image when a space including an object of a display target is viewed from a freely selected point of view and represents an image when the space is viewed from a predetermined reference point of view. The reference image data generating method includes a step of rendering a plurality of the reference images in a field of view corresponding to a plurality of the reference points of view, a step of deleting, when the same point on the object appears in a plurality of the reference images, data of an image of the point from any reference image, and a step of generating index data that associates identification information indicating that data has been deleted with a region in which the data has been deleted in the reference image, and outputting the index data in association with data of the reference image.

Note that, what are obtained by translating any combination of the above constituent elements and expressions of the present invention among method, apparatus, system, computer program, data structure, recording medium, and so forth are also effective as modes of the present invention.

Advantageous Effect of Invention

According to the present invention, both responsiveness of image displaying with respect to the point of view and image quality can be achieved.

BRIEF DESCRIPTION OF DRAWINGS

FIG. 22 is a diagram for explaining a problem when a display image is rendered through simply referring to two reference points of view in the case in which they are set near an object with high specular reflectance in the present embodiment.

DESCRIPTION OF EMBODIMENT

The present embodiment displays an image with a field of view according to the point of view of a user basically. As long as this is satisfied, the kind of apparatus that displays an image is not particularly limited and the apparatus may be any of wearable display, flat-plate-shaped display, projector, and so forth. Here, description will be made by taking as an example a head-mounted display in wearable displays.

In the case of the wearable display, the line of sight of the user can roughly be estimated by an incorporated motion sensor. In the case of the other kinds of display apparatuses, the user wears a motion sensor on the head or uses a point-of-gaze detecting apparatus and thereby the line of sight can be detected. Alternatively, the line of sight may be estimated by mounting a marker on the head of a user and analyzing an image obtained by photographing the appearance thereof, or any of these techniques may be combined.

Figure 1:
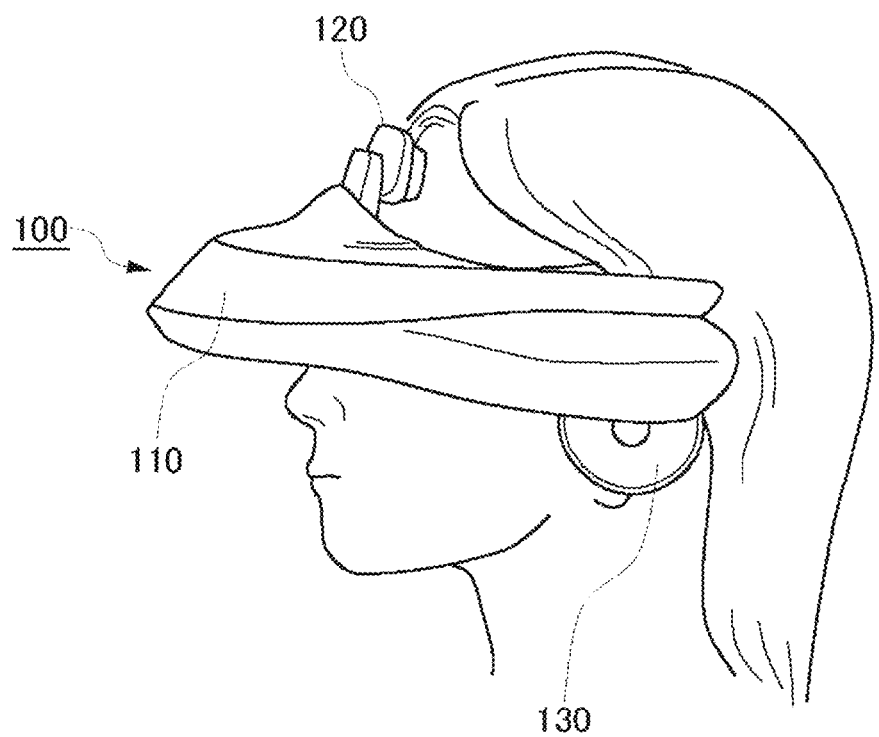
FIG. 1 is a diagram depicting an appearance example of a head-mounted display of the present embodiment.

FIG. 1 depicts an appearance example of a head-mounted display 100. The head-mounted display 100 includes a main unit 110, a frontal-region contact part 120, and temporal-region contact parts 130. The head-mounted display 100 is a display apparatus for being mounted on the head of a user to view still images, moving images, and so forth displayed on a display and listen to voice, music, and so forth output from a headphone. Orientation information such as the rotation angle and the tilt about the head of the user who wears the head-mounted display 100 can be measured by a motion sensor incorporated in or externally attached to the head-mounted display 100.

The head-mounted display 100 is one example of "wearable display apparatus." In the wearable display apparatus, not only the head-mounted display 100 in a narrow sense but freely selected display apparatuses that can be mounted, such as eyeglasses, eyeglasses-type display, eyeglasses-type camera, headphone, headset (headphone equipped with a microphone), earphone, earring, ear-hook camera, headwear, headwear equipped with a camera, and hair band, are included.

Figure 2:
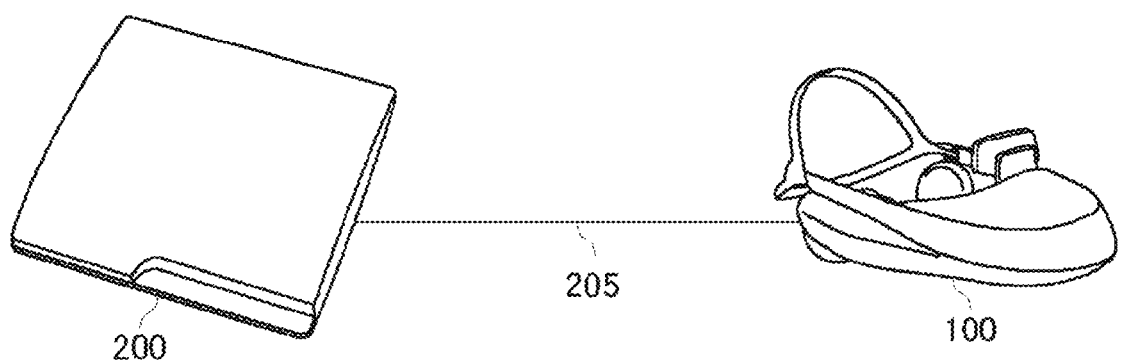
FIG. 2 is a configuration diagram of an information processing system of the present embodiment.

FIG. 2 is a configuration diagram of an information processing system according to the present embodiment. The head-mounted display 100 is connected to an image generating apparatus 200 by wireless communication or an interface 205 to connect peripheral equipment of the USB (Universal Serial Bus) or the like. The image generating apparatus 200 may be further connected to a server through a network. In this case, the server may offer the image generating apparatus 200 an online application of a game or the like in which plural users can participate through the network.

The image generating apparatus 200 identifies the position of the point of view and the direction of the line of sight based on the position and orientation of the head of the user who wears the head-mounted display 100, and generates a display image in such a manner that a field of view according to it is obtained and outputs the display image to the head-mounted display 100. As long as this is satisfied, the purpose of displaying the image may be various. For example, the image generating apparatus 200 may generate a virtual world that is the stage of an electronic game as a display image while progressing the game, or display a still image or moving image as an image for viewing irrespective of whether the displayed world is a virtual world or a real world. In the case of employing the head-mounted display as the display apparatus, it is also possible to produce the state of being immersed in the displayed world when a panorama image is allowed to be displayed in a wide angle range centered at the point of view.

Figure 3:
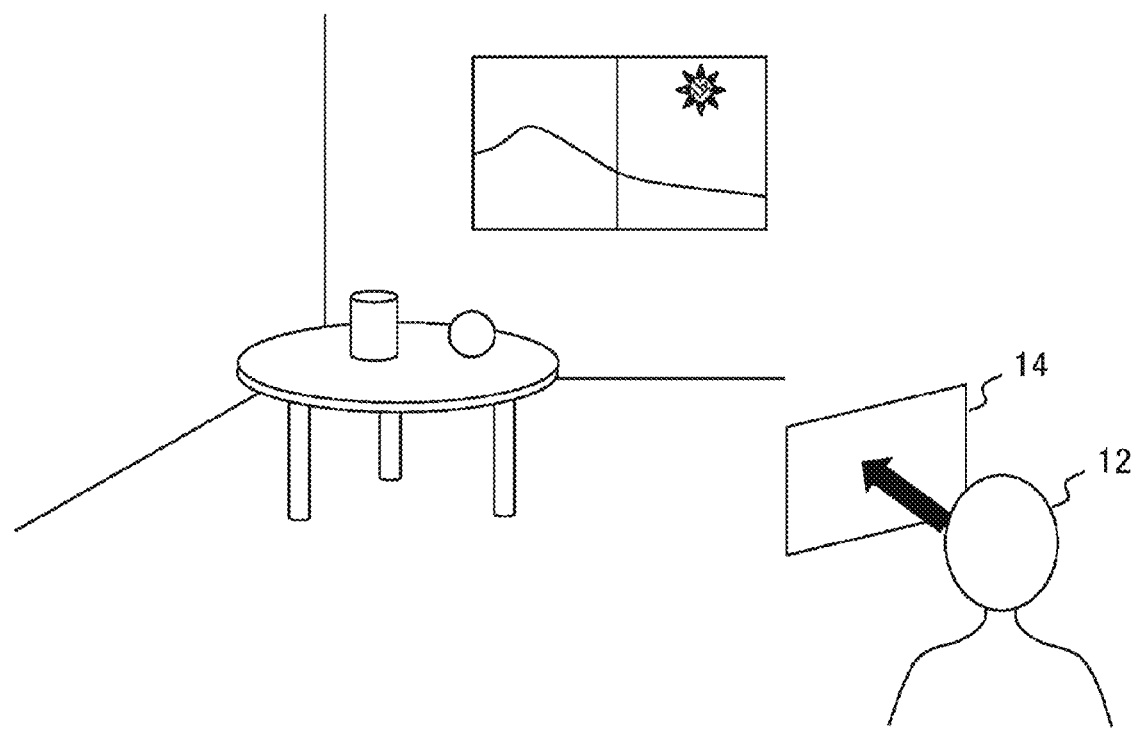
FIG. 3 is a diagram for explaining an example of an image world which an image generating apparatus of the present embodiment causes the head-mounted display to display.

FIG. 3 is a diagram for explaining an example of an image world which the image generating apparatus 200 causes the head-mounted display 100 to display in the present embodiment. In this example, the state in which a user 12 exists in a room that is a virtual space is made. In a world coordinate system that defines the virtual space, objects such as wall, floor, window, table, and things on the table are disposed as depicted in the diagram. The image generating apparatus 200 defines a view screen 14 in this world coordinate system according to the position of the point of view and the direction of the line of sight of the user 12 and projects images of the objects onto it to thereby render a display image.

When the position of the point of view and the direction of the line of sight (hereinafter, they will be referred to as "point of view" comprehensively in some cases) of the user 12 are acquired at a predetermined rate and the position and direction of the view screen 14 are changed according to this, the image can be displayed with a field of view corresponding to the point of view of the user. It is also possible to allow stereoscopic viewing of a virtual space when stereo images having parallax are generated and are displayed in front of right and left eyes in the head-mounted display 100. This allows the user 12 to experience virtual reality as if the user 12 existed in a room of the displayed world. Although a virtual world premised on computer graphics is employed as the display target in the example depicted in the diagram, a photographed image of a real world, such as a panorama picture, may be employed or it may be combined with a virtual world.

To cause such displaying to involve a sense of presence, it is desirable to reflect physical phenomena that occur in the space of the display target as accurately as possible. For example, change in the color tone and luminance of an object surface due to motion of the point of view can be expressed more realistically by accurately calculating propagation of various kinds of light that reach the eye, such as diffuse reflection and specular reflection at the object surface and ambient light. A representative method to implement this is ray tracing. However, it is conceivable that latency that cannot be overlooked occurs until displaying due to execution of such physical calculation with high accuracy particularly in an environment in which a free point of view is permitted.

Thus, in the present embodiment, an image obtained by viewing from a specific point of view is acquired in advance and is used for decision of a pixel value of a display image with respect to a freely selected point of view. That is, the color of an object that appears as an image in the display image is decided through extraction from the corresponding place in the image acquired in advance. Hereinafter, the point of view set in preliminary image acquisition will be referred to as "reference point of view" and the image that is obtained by viewing from the reference point of view and is acquired in advance will be referred to as "reference image" or "image of the reference point of view." By acquiring part of data used for rendering of the display image in advance as the reference image, latency from the movement of the point of view to displaying can be suppressed. Furthermore, basically there is no limitation in terms of time at the stage of generation of the reference image. Therefore, physical calculation of ray tracing or the like can be carried out with high accuracy over time.

When plural reference points of view are set while being dispersed in a movable range envisaged regarding the point of view at the time of displaying and the reference image is prepared regarding each reference point of view, the color tone of the same object viewed from the plural points of view can be taken into account and the object according to the point of view at the time of displaying can be expressed with higher accuracy. Specifically, when the point of view at the time of displaying corresponds with one of the reference points of view, the pixel value of the reference image corresponding to this reference point of view can be employed as it is. When the point of view at the time of displaying exists among plural reference points of view, the pixel value of the display image is decided by combining the pixel values of the reference images corresponding to these plural reference points of view.

Figure 4:
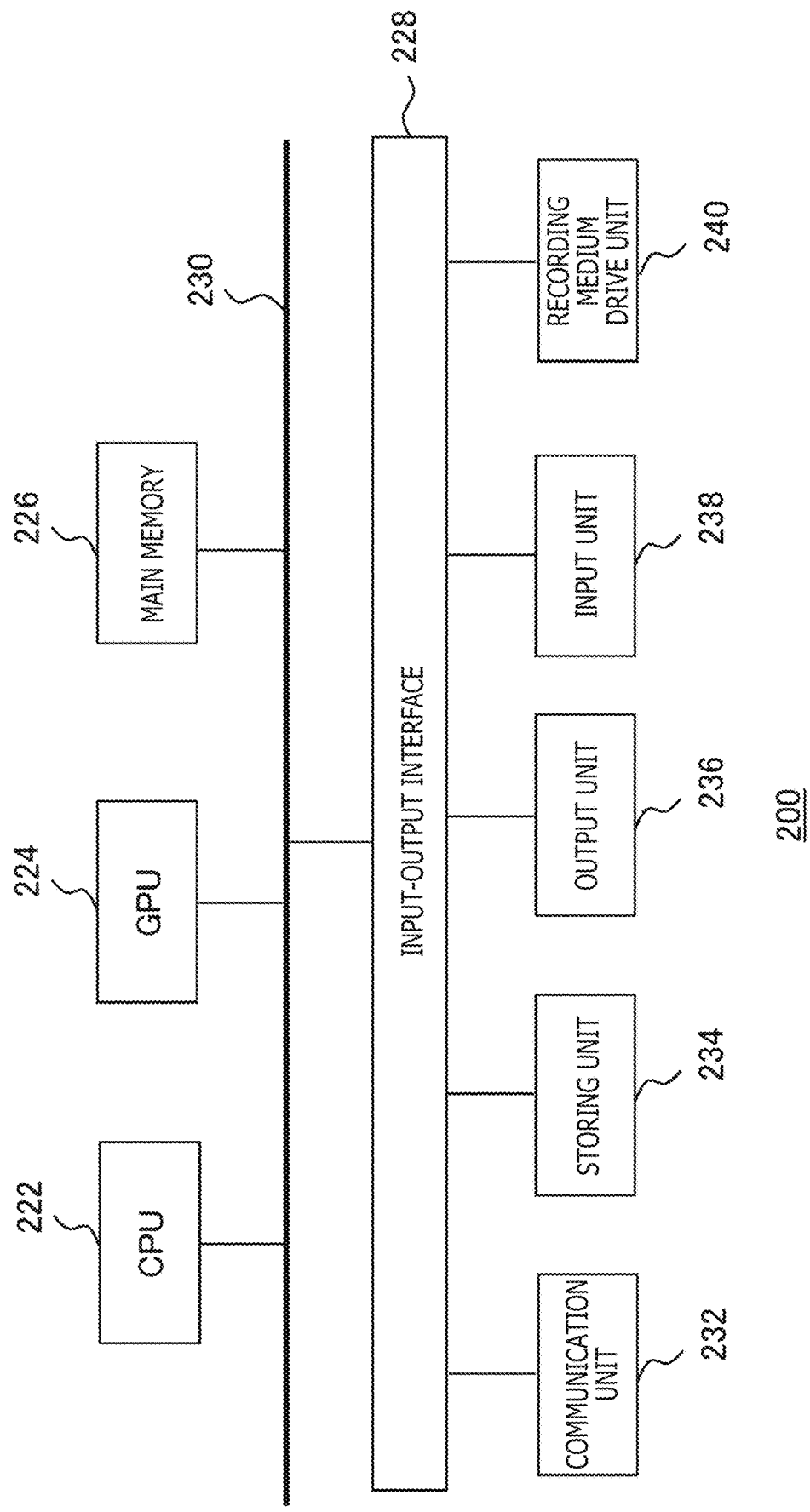
FIG. 4 is a diagram depicting an internal circuit configuration of an information processing apparatus of the present embodiment.

FIG. 4 depicts an internal circuit configuration of the image generating apparatus 200. The image generating apparatus 200 includes a CPU (Central Processing Unit) 222, a GPU (Graphics Processing Unit) 224, and a main memory 226. These respective units are mutually connected through a bus 230. An input-output interface 228 is further connected to the bus 230.

The following respective units are connected to the input-output interface 228: a communication unit 232 formed of peripheral equipment interfaces of USB, IEEE (Institute of Electrical and Electronics Engineers) 1394, and so forth and a network interface of a wired or wireless LAN (Local Area Network); a storing unit 234 such as a hard disk drive and a non-volatile memory; an output unit 236 that outputs data to a display apparatus such as the head-mounted display 100; an input unit 238 to which data is input from the head-mounted display 100; and a recording medium drive unit 240 that drives a removable recording medium such as a magnetic disc, optical disc, or semiconductor memory.

The CPU 222 controls the whole of the image generating apparatus 200 by executing an operating system stored in the storing unit 234. Furthermore, the CPU 222 executes various kinds of programs that are read out from a removable recording medium and are loaded into the main memory 226 or are downloaded via the communication unit 232. The GPU 224 has functions of a geometry engine and functions of a rendering processor and executes rendering processing in accordance with a rendering command from the CPU 222 to store a display image in a frame buffer that is not depicted in the diagram. Then, the GPU 224 converts the display image stored in the frame buffer to a video signal and outputs the video signal to the output unit 236. The main memory 226 is formed of a RAM (Random Access Memory) and stores program and data necessary for processing.

Figure 5:
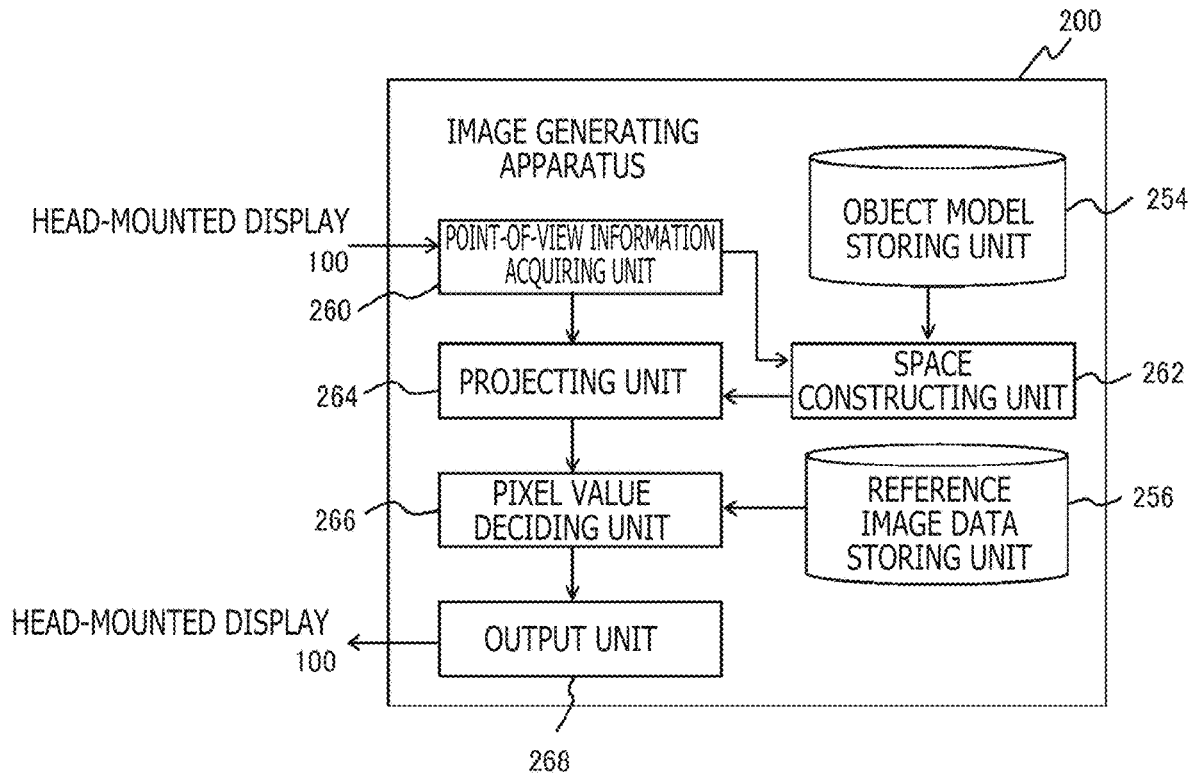
FIG. 5 is a diagram depicting functional blocks of the image generating apparatus in the present embodiment.

FIG. 5 depicts a configuration of functional blocks of the image generating apparatus 200 in the present embodiment. The image generating apparatus 200 may execute general information processing of progressing an electronic game and communicating with a server as described above. In FIG. 5, the image generating apparatus 200 is depicted with focus on a function of generating data of a display image according to the point of view particularly. At least part of the functions of the image generating apparatus 200 depicted in FIG. 5 may be implemented in the head-mounted display 100. Alternatively, at least part of the functions of the image generating apparatus 200 may be implemented in a server connected to the image generating apparatus 200 through a network.

Furthermore, the functional blocks depicted in FIG. 5 and FIG. 6 to be described later can be implemented by the configuration of CPU, GPU, and various memories depicted in FIG. 4 in terms of hardware. In terms of software, the functional blocks are implemented by a program that is loaded from a recording medium or the like into a memory and exerts various functions such as data input function, data holding function, image processing function, and communication function. Therefore, it is understood by those skilled in the art that these functional blocks can be implemented in various forms by only hardware or only software or a combination thereof, and the functional blocks are not limited to any.

The image generating apparatus 200 includes a point-of-view information acquiring unit 260 that acquires information relating to the point of view of a user, a space constructing unit 262 that constructs a space formed of objects of display targets, a projecting unit 264 that projects objects onto a view screen, a pixel value deciding unit 266 that decides the values of pixels configuring the image of the object and completes a display image, and an output unit 268 that outputs data of the display image to the head-mounted display 100. The image generating apparatus 200 further includes an object model storing unit 254 that stores data relating to an object model necessary for construction of a space and a reference image data storing unit 256 that stores data of the reference image.

The point-of-view information acquiring unit 260 is formed of the input unit 238, the CPU 222, and so forth in FIG. 4 and acquires the position of the point of view and the direction of the line of sight of a user at a predetermined rate. For example, the point-of-view information acquiring unit 260 sequentially acquires an output value of an acceleration sensor incorporated in the head-mounted display 100 and acquires the orientation of the head based on it. Moreover, a light emitting marker that is not depicted in the diagram is disposed outside the head-mounted display 100 and a photographed image thereof is acquired from an imaging apparatus that is not depicted in the diagram. Thereby, the position of the head in a real space is acquired.

Alternatively, an imaging apparatus that photographs an image corresponding to the field of view of the user and is not depicted in the diagram may be disposed on the side of the head-mounted display 100 and the position and orientation of the head may be acquired by a technique such as SLAM (Simultaneous Localization and Mapping). If the position and orientation of the head can be acquired in this manner, the position of the point of view and the direction of the line of sight of the user can roughly be identified. It is understood by those skilled in the art that the method for acquiring the information relating to the point of view of the user is not limited to the case of using the head-mounted display 100 and various methods are conceivable.

The space constructing unit 262 is formed of the CPU 222, the GPU 224, the main memory 226, and so forth in FIG. 4 and constructs a shape model of a space in which objects of display targets exist. In the example depicted in FIG. 3, objects such as wall, floor, window, table, things on the table that represent the inside of a room are disposed in the world coordinate system that defines a virtual space. The space constructing unit 262 reads out information relating to the shapes of the individual objects from the object model storing unit 254. The space constructed by the space constructing unit 262 may be fixed or may be changed according to the progress of a game or the like.

Here, it suffices for the space constructing unit 262 to decide the shape, position, and orientation of the object, and a method of modeling based on a surface model in general computer graphics can be used. The projecting unit 264 is formed of the GPU 224, the main memory 226, and so forth in FIG. 4 and sets the view screen according to the information on the point of view acquired by the point-of-view information acquiring unit 260. Specifically, the projecting unit 264 sets screen coordinates corresponding to the position of head and the direction in which the face is oriented to thereby cause the space of the display target to be rendered on the screen plane with a field of view according to the position of the user and the direction in which the user is oriented.

Moreover, the projecting unit 264 projects objects in the space constructed by the space constructing unit 262 onto the view screen. Also for this processing, a method of general computer graphics in which meshes of polygons and so forth are subjected to perspective transformation can be used. The pixel value deciding unit 266 is formed of the GPU 224, the main memory 226, and so forth in FIG. 4 and decides the values of pixels configuring the image of the object made through projection onto the view screen. At this time, the pixel value deciding unit 266 reads out data of the reference image from the reference image data storing unit 256 as described above and extracts and uses the value of the pixel that represents a point on the same object.

For example, the corresponding pixel is identified from the reference image generated with respect to the reference point of view around the actual point of view and averaging is carried out with a weight based on the distance or angle between the actual point of view and the reference point of view. Thereby, the pixel value of the display image is made. By accurately generating the reference image by ray tracing or the like over time, at the time of operation, high-definition image expression close to that in the case of carrying out ray tracing can be implemented through light-load calculation of reading out the corresponding pixel value and carrying out weighted averaging.

It is desirable to make the reference points of view be distributed to cover the movable range of the point of view of the user. The reference image is not limited to a graphics image rendered by ray tracing and may be an image obtained by photographing a real space from the reference point of view in advance, or the like. In this case, the space constructing unit 262 constructs a shape model of the real space as the photographing target and the projecting unit 264 projects this shape model onto a view screen according to the point of view at the time of displaying. Alternatively, it is also possible to omit processing of the space constructing unit 262 and the projecting unit 264 if the position of the image of an object of a photographing target can be decided with a field of view according to the point of view at the time of displaying.

In the case of causing the display image to be viewed stereoscopically, the projecting unit 264 and the pixel value deciding unit 266 may execute processing for each of the points of view regarding the left eye and the right eye. The output unit 268 is formed of the CPU 222, the main memory 226, the output unit 236, and so forth in FIG. 4 and sends out data of the display image completed through deciding the pixel value by the pixel value deciding unit 266 to the head-mounted display 100 at a predetermined rate. When stereo images are generated for stereoscopic viewing, the output unit 268 generates an image obtained by coupling them as left and right images as a display image and outputs the image. In the case of the head-mounted display 100 with a configuration in which the display image is viewed through a lens, the output unit 268 may carry out correction decided in consideration of distortion due to this lens for the display image.

Figure 6:
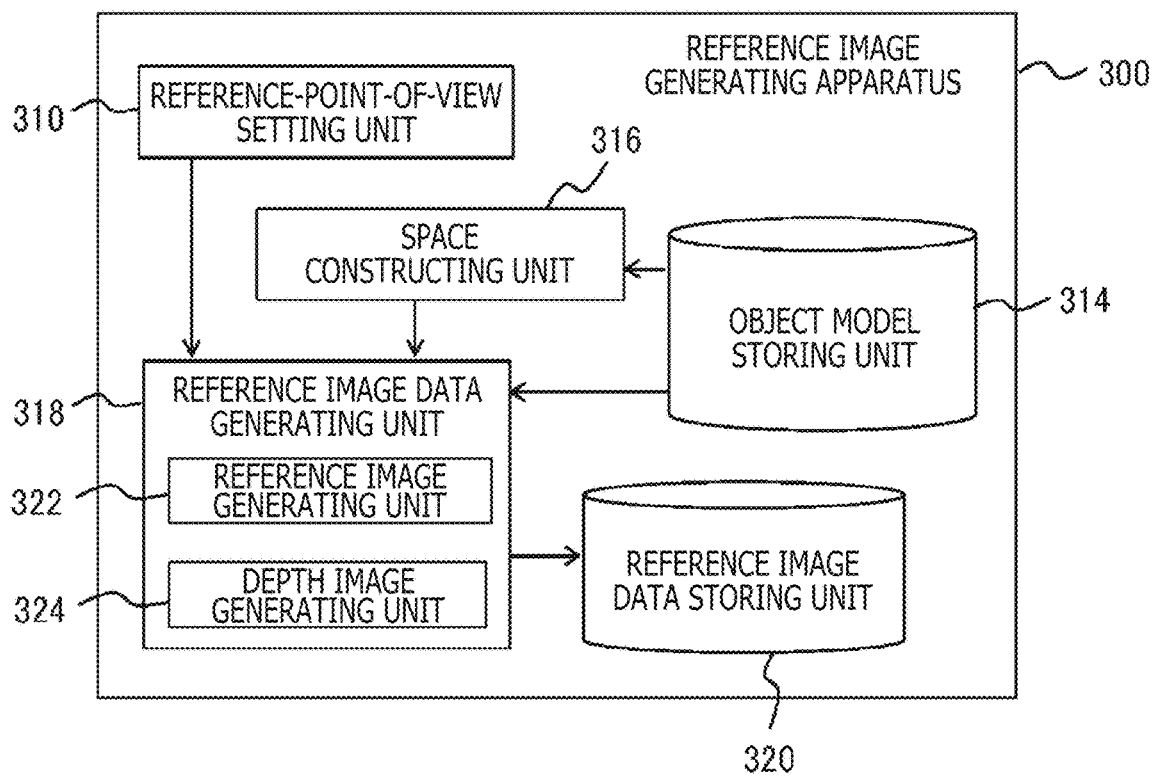
FIG. 6 is a diagram depicting functional blocks of an apparatus that generates data of a reference image in the present embodiment.

FIG. 6 depicts functional blocks of an apparatus that generates data of a reference image in the case of generating the reference image by rendering processing. A reference image generating apparatus 300 may be set as part of the image generating apparatus 200 of FIG. 5 or may be independently disposed as an apparatus that generates data to be stored in the reference image data storing unit 256 in FIG. 5. Furthermore, data including generated data of the reference image and an object model used for the generation may be stored in a recording medium or the like as electronic content and be allowed to be loaded into the main memory in the image generating apparatus 200 at the time of operation. The internal circuit configuration of the reference image generating apparatus 300 may be similar to the internal circuit configuration of the image generating apparatus 200 depicted in FIG. 4.

The reference image generating apparatus 300 includes a reference-point-of-view setting unit 310 that sets the reference point of view, a space constructing unit 316 that constructs a space formed of objects of display targets, a reference image data generating unit 318 that generates data of the reference image regarding each reference point of view based on a constructed space, an object model storing unit 314 that stores data relating to an object model necessary for construction of a space, and a reference image data storing unit 320 that stores generated data of the reference image.

The reference-point-of-view setting unit 310 is formed of the input unit 238, the CPU 222, the main memory 226, and so forth and sets the position coordinates of the reference point of view in the space of the display target. Preferably, the reference-point-of-view setting unit 310 causes plural reference points of view to be distributed to cover the range of the point of view that can be taken by the user as described above. Such a range and an appropriate value of the number of reference points of view differ depending on the configuration of the space of the display target, the purpose of displaying, accuracy required for displaying, the processing performance of the image generating apparatus 200, and so forth. Thus, the reference-point-of-view setting unit 310 may accept input by a user relating to the position coordinates of the reference point of view.

The space constructing unit 316 is formed of the CPU 222, the GPU 224, the main memory 226, and so forth and constructs a shape model of a space in which objects of display targets exist. This function corresponds to the function of the space constructing unit 262 depicted in FIG. 5. Meanwhile, in the reference image generating apparatus 300 of FIG. 6, a modeling method based on a solid model for which the color and material of objects are taken into account is used in order to accurately render the images of the objects by ray tracing or the like. For this purpose, model data of the objects including information on the color, material, and so forth is stored in the object model storing unit 314.

The reference image data generating unit 318 is formed of the CPU 222, the GPU 224, the main memory 226, and so forth and includes a reference image generating unit 322 and a depth image generating unit 324. Regarding each reference point of view set by the reference-point-of-view setting unit 310, the reference image generating unit 322 renders objects of display targets viewed from the reference point of view. Preferably the reference images are prepared as 360 degrees panorama images based on the equidistant cylindrical projection or the like. Due to this, the point of view at the time of displaying can also be freely changed in all orientations. Furthermore, it is desirable to accurately represent how objects look at each reference point of view in the reference image by carrying out calculation over time regarding propagation of light beams.

The depth image generating unit 324 generates a depth image corresponding to the reference image generated by the reference image generating unit 322. Specifically, the depth image generating unit 324 generates the depth image by obtaining the distance from the view screen (depth value) regarding the object represented by each pixel of the reference image and giving it as the pixel value. When a 360 degrees panorama image is employed as the reference image, the view screen becomes a spherical surface and therefore the depth value becomes the distance to the object in the normal direction of this spherical surface. The generated depth image is used for selection of the reference image used when the pixel value of the display image is decided. The reference image data generating unit 318 stores data of the reference images and the depth images generated in this manner in the reference image data storing unit 320 in association with the position coordinates of the reference points of view.

Figure 7:
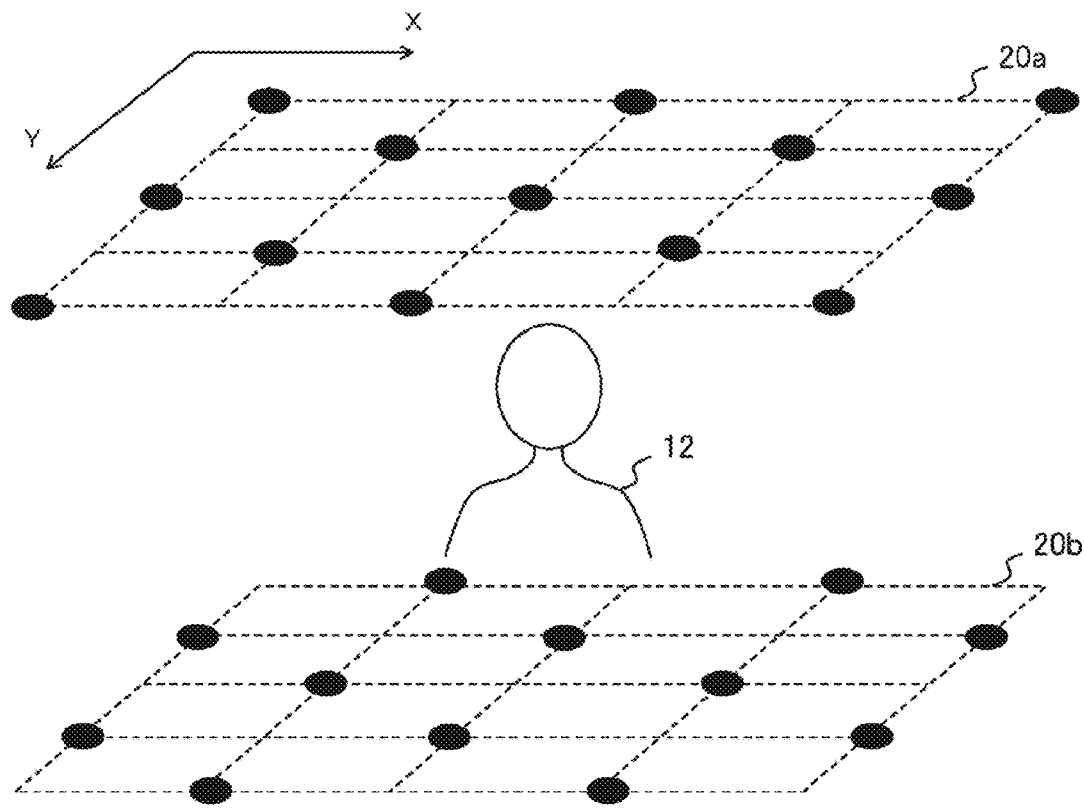
FIG. 7 is a diagram depicting a setting example of reference points of view in the present embodiment.

FIG. 7 depicts a setting example of the reference points of view. In this example, plural reference points of view are set as depicted by black circles in each of a horizontal plane 20a at the height of the eyes when the user 12 stands and a horizontal plane 20b at the height of the eyes when the user 12 sits. As one example, the horizontal plane 20a is at 1.4 m from the floor and the horizontal plane 20b is at 1.0 m from the floor, or the like. Furthermore, a movement range according to the contents of displaying is envisaged in the left-right direction (X-axis direction in the diagram) and the front-rear direction (Y-axis direction in the diagram) defined with the standard position (home position) of the user being the center, and the reference points of view are distributed in corresponding rectangular regions on the horizontal planes 20a and 20b.

In this example, the reference points of view are disposed at every second intersection of the lattice that divides the rectangular region into quarters in each of the X-axis direction and the Y-axis direction. Furthermore, the reference points of view are disposed to be shifted in such a manner that the reference points of view do not overlap between the upper and lower horizontal planes 20a and 20b. As a result, in the example depicted in FIG. 7, 13 reference points of view in the upper horizontal plane 20a and 12 reference points of view in the lower horizontal plane 20b, i.e., 25 reference points of view in total, are set.

However, the example does not intend to limit the distribution of the reference points of view to this. The reference points of view may be distributed on plural planes including also a perpendicular surface and so forth or may be distributed on a curved surface such as a spherical surface. Furthermore, without setting the distribution even, the reference points of view may be distributed with higher density than in the other range in a range in which the probability of existence of a user is higher. Moreover, in the case of producing motion of moving and deforming an object of a display target, the reference point of view may also be moved according to this. In this case, the reference image with respect to each reference point of view is data of a moving image that reflects this motion.

Furthermore, plural reference points of view may be set for a specific object in such a manner as to surround it and dedicated reference images may be prepared, and the dedicated reference images may be combined at the time of generation of a display image of the whole space including this object. In this case, the image generating apparatus 200 projects a mesh of this object onto the view screen similarly to the other objects and then uses the separately-prepared reference images dedicated for this object for decision of the pixel value. This can implement more detailed expression regarding an important object, an object with a high possibility of being viewed from a close position, and so forth and movement and deformation of only the specific object without increasing the amount of reference image data.

Figure 8:
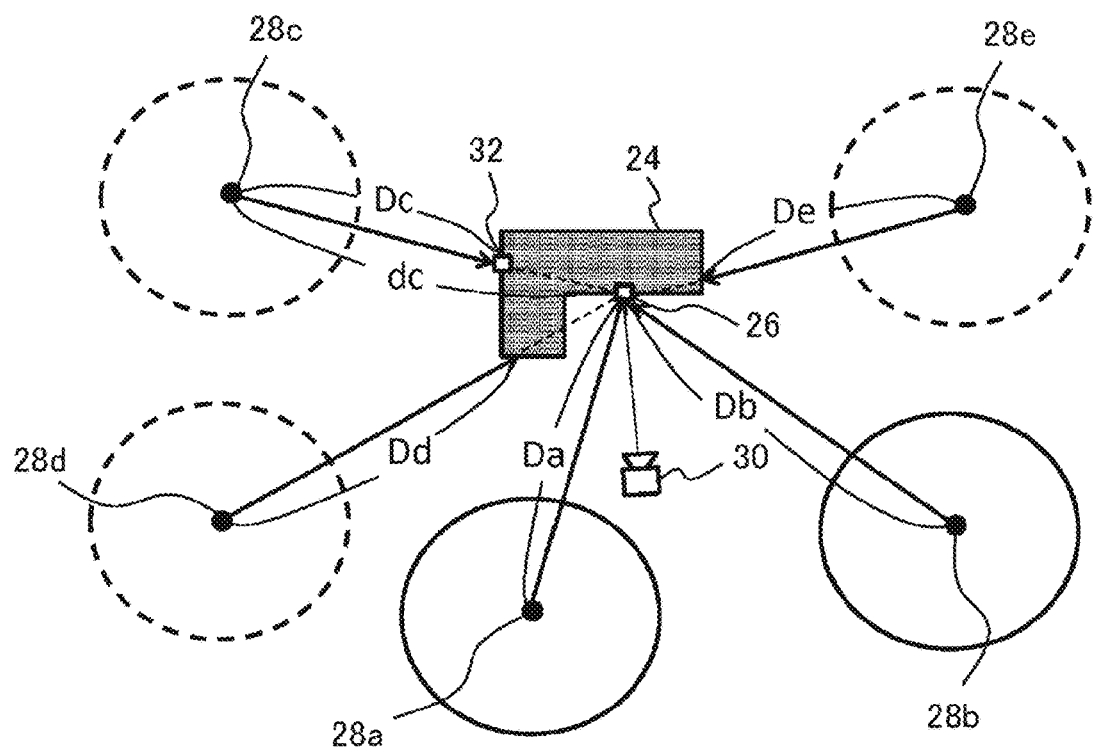
FIG. 8 is a diagram for explaining a method in which a pixel value deciding unit in the present embodiment selects the reference image used for decision of the pixel value of a display image.

FIG. 8 is a diagram for explaining a method in which the pixel value deciding unit 266 of the image generating apparatus 200 selects the reference image used for decision of the pixel value of the display image. This diagram depicts the state when a space of the display target including an object 24 is overlooked. Suppose that, in this space, five reference points 28a to 28e of view are set and data of the reference image has been generated for each. In this diagram, circles centered at the reference points 28a to 28e of view schematically depict screen surfaces of the reference images prepared as omnidirectional panorama images.

Supposing that the point of view of the user at the time of image displaying exists at the position of a virtual camera 30, the projecting unit 264 decides a view screen corresponding to the virtual camera 30 and projects a model shape of the object 24. As a result, the correspondence relationship between pixels in the display image and the position on the surface of the object 24 is found out. Then, for example, in the case of deciding the value of the pixel that represents the image of a point 26 on the surface of the object 24, the pixel value deciding unit 266 first identifies the reference image in which the point 26 appears as the image.

The position coordinates of the respective reference points 28a to 28e of view and the point 26 in the world coordinate system are known and therefore the distances thereof are easily obtained. In the diagram, the distances are depicted by the lengths of line segments that couple the respective reference points 28a to 28e of view and the point 26. Furthermore, when the point 26 is projected onto the view screen of each reference point of view, the position of the pixel at which the image of the point 26 should appear in each reference image can also be identified. Meanwhile, depending on the position of the reference point of view, the point 26 exists on the back side of an object or is hidden by an object existing on the front side, so that the image thereof does not appear at the relevant position in the reference image in some cases.

Thus, the pixel value deciding unit 266 checks the depth image corresponding to each reference image. The pixel value of the depth image represents the distance from the screen surface regarding an object that appears as an image in the corresponding reference image. Therefore, by comparing the distance from the reference point of view to the point 26 and the depth value of the pixel at which the image of the point 26 should appear in the depth image, whether or not the relevant image is the image of the point 26 is determined.

For example, a point 32 on the back side of the object 24 exists on the line of sight from the reference point 28c of view to the point 26. Thus, the pixel at which the image of the point 26 should appear in the corresponding reference image actually represents the image of the point 32. Therefore, the value indicated by the pixel of the corresponding depth image is the distance to the point 32 and a distance Dc resulting from conversion into the value when the reference point 28c of view is deemed as the starting point is obviously shorter than a distance dc to the point 26 calculated from the coordinate values. Thus, when the difference between the distance Dc obtained from the depth image and the distance dc to the point 26 obtained from the coordinate values is equal to or larger than a threshold, the relevant reference image is excluded from the calculation of the pixel value that represents the point 26.

Similarly, it is deemed that distances Dd and De to the object regarding the corresponding pixel obtained from the depth images of the reference points 28d and 28e of view have a difference equal to or larger than the threshold from the distances from the respective reference points 28d and 28e of view to the point 26, and the relevant reference images are excluded from the calculation. On the other hand, it can be identified by the threshold determination that distances Da and Db to the object regarding the corresponding pixel obtained from the depth images of the reference points 28a and 28b of view are substantially the same as the distances from the respective reference points 28a and 28b of view to the point 26. The pixel value deciding unit 266 carries out screening with use of the depth value as above to thereby select the reference image used for calculation of the pixel value regarding each pixel of the display image.

Although the five reference points of view are exemplified in FIG. 8, actually the comparison with use of the depth value is carried out for all reference points of view distributed as depicted in FIG. 7. This allows rendering of the display image with high accuracy. On the other hand, it is also conceivable that referring to approximately 25 depth images and reference images regarding all pixels of the display image yields a load that cannot be overlooked depending on the processing performance of the apparatus. Thus, prior to selecting the reference image used for decision of the pixel value as described above, the reference images employed as selection candidates may be narrowed down based on a predetermined criterion. For example, the reference points of view that exist in a predetermined range from the virtual camera 30 are extracted and selection processing with use of the depth value is executed with limitation to the reference images from them.

At this time, the upper limit of extracted reference points of view may be set to 10, 20, or the like, and the range of the extraction target may be adjusted or choice may be made randomly or based on a predetermined rule in such a manner that the number of extracted reference points of view is set equal to or smaller than such an upper limit. Furthermore, the number of extracted reference points of view may be made different depending on the region on the display image. For example, in the case of implementing virtual reality by using a head-mounted display, the central region of the display image corresponds with the direction in which the line of sight of the user is oriented and therefore rendering with higher accuracy than in the peripheral region is desirable.

Thus, a somewhat large number of reference points of view (reference images) are employed as selection candidates regarding pixels that exist in a predetermined range of the center of the display image, whereas the number of selection candidates is reduced regarding pixels that exist outside it. As one example, it is conceivable that approximately 20 reference images are employed as selection candidates for the central region and approximately 10 reference images are employed for the peripheral region. However, the number of regions is not limited to two and three or more regions may be set. Furthermore, the way of region segmentation is not limited to segmentation that depends on the distance from the center of the display image, and it is also conceivable that segmentation is dynamically carried out based on the region of the image of an object to which attention is paid, or the like. By controlling the number of reference images to which reference is made based on a factor other than whether or not the image of an object appears as above, it becomes possible to render the display image under the optimum condition decided in consideration of accuracy required for the processing performance of the apparatus and displaying, the contents of displaying, and so forth.

Figure 9:
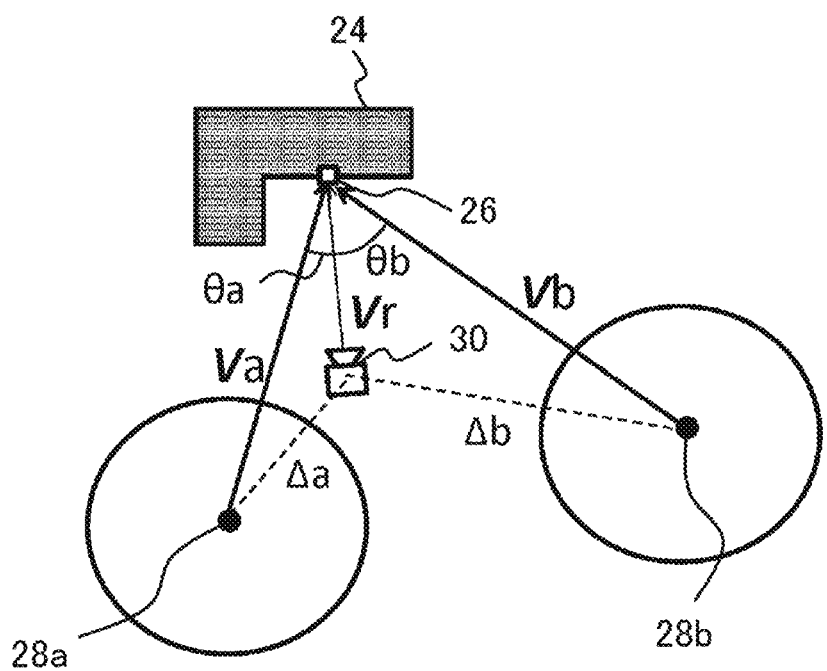
FIG. 9 is a diagram for explaining a method in which the pixel value deciding unit in the present embodiment decides the pixel value of the display image.

FIG. 9 is a diagram for explaining a method in which the pixel value deciding unit 266 decides the pixel value of the display image. Suppose that it has turned out that the image of the point 26 of the object 24 is represented on the reference images of the reference points 28a and 28b of view as depicted in FIG. 8. Basically, the pixel value deciding unit 266 decides the pixel value of the image of the point 26 in the display image corresponding to the actual point of view by blending the pixel values of the image of the point 26 in these reference images.

Here, when the pixel values (color values) of the image of the point 26 in the reference images of the reference points 28a and 28b of view are defined as $c_1$ and $c_2$, respectively, a pixel value C in the display image is calculated as follows.

$$C = w_1 \cdot c_1 + w_2 \cdot c_2$$

Here, coefficients $w_1$ and $w_2$ represent weights having a relationship of $w_1 + w_2 = 1$, i.e., the contribution rate of the reference image, and are decided based on the positional relationship between the reference points 28a and 28b of view and the virtual camera 30 that represents the actual point of view. For example, when the distance from the virtual camera 30 to the reference point of view is shorter, a larger coefficient is employed to set the contribution rate higher.

In this case, when the distances from the virtual camera 30 to the reference points 28a and 28b of view are defined as $\Delta a$ and $\Delta b$ and $\text{sum} = 1/\Delta a^2 + 1/\Delta b^2$ is set, it is conceivable that the following functions are employed as the weight coefficients.

$$w_1 = (1/\Delta a^2)/\text{sum}$$

$$w_2 = (1/\Delta b^2)/\text{sum}$$

The following expression is obtained when the above expression is generalized in such a manner that the number of reference images used is defined as N and an identification number of the reference point of view is defined as i ($1 \le i \le N$) and the distance from the virtual camera 30 to the i-th reference point of view is defined as $\Delta i$ and the corresponding pixel value in each reference image is defined as $c_i$ and the weight coefficient is defined as $w_i$. However, this does not intend to limit the calculation expression thereto.

[Math. 1]

$$C = \sum_{i=1}^{N} w_i \cdot c_i \qquad \text{(Expression 1)}$$

$$w_i = \frac{1}{\Delta i^2} \cdot \frac{1}{\text{sum}}, \ \text{sum} = \sum_{i=1}^{N} \frac{1}{\Delta i^2}$$

When $\Delta i$ is 0 in the above expression, that is, when the virtual camera 30 corresponds with any reference point of view, the weight coefficient for the pixel value of the corresponding reference image is set to 1 and the weight coefficients for the pixel values of the other reference images are set to 0. Due to this, the reference image created with high accuracy with respect to this point of view can be reflected in the display image as it is.

Furthermore, the parameter used for calculation of the weight coefficient is not limited to the distance from the virtual camera to the reference point of view. For example, the weight coefficients may be based on angles $\theta a$ and $\theta b$ ($0 \le \theta a, \theta b \le 90$ degrees) formed by line-of-sight vectors Va and Vb from the respective reference points of view to the point 26 with respect to a line-of-sight vector Vr from the virtual camera 30 to the point 26. For example, the weight coefficients are calculated as follows by using inner products (Va·Vr) and (Vb·Vr) between the vectors Va and Vb and the vector Vr.

$$w_1 = (Va \cdot Vr)/((Va \cdot Vr) + (Vb \cdot Vr))$$

$$w_2 = (Vb \cdot Vr)/((Va \cdot Vr) + (Vb \cdot Vr))$$

The following expression is obtained when the above expression is generalized in such a manner that the number of reference images used is defined as N and the line-of-sight vector from the reference point i of view to the point 26 is defined as $V_i$ and the weight coefficient is defined as $w_i$ similarly to the above description.

[Math. 2]

$$w_i = \frac{(V_i \cdot Vr)}{\sum_{i=1}^{N}(V_i \cdot Vr)} \quad \text{(Expression 2)}$$

The specific calculation expression is not particularly limited as long as a calculation rule with which a higher weight coefficient is set for the reference point of view whose state with respect to the point 26 is closer to the virtual camera 30 is introduced in any case. The "closeness of the state" may be multidirectionally evaluated from both the distance and the angle and the weight coefficient may be decided. Moreover, the surface shape of the object 24 at the point 26 may be taken into account. The luminance of reflected light from the object generally has angle dependence based on the inclination of (normal to) the surface. Thus, the angle formed by a normal vector at the point 26 and the line-of-sight vector Vr from the virtual camera 30 and the angles formed between this normal vector and the line-of-sight vectors Va and Vb from the respective reference points of view are compared, and the weight coefficient may be set higher when the difference thereof is smaller.

Furthermore, the function itself to calculate the weight coefficient may be switched depending on the attributes of the object 24, such as the material and the color. For example, in the case of a material regarding which the specular reflection component is dominant, the material has strong directivity and the observed color greatly changes depending on the angle of the line-of-sight vector. On the other hand, in the case of a material regarding which the diffuse reflection component is dominant, change in the color with respect to the angle of the line-of-sight vector is not so large. Thus, in the former case, a function that makes the weight coefficient higher for the reference point of view having a line-of-sight vector closer to the line-of-sight vector Vr from the virtual camera 30 to the point 26 may be used. In the latter case, a function that equalizes the weight coefficient for all reference points of view and makes the angle dependence small compared with the case in which the specular reflection component is dominant may be used.

Furthermore, for the same reason, in the case of a material regarding which the diffuse reflection component is dominant, the reference images used for decision of the pixel value C of the display image may be decimated or only the reference images having the line-of-sight vector with an angle close to the actual line-of-sight vector Vr by a predetermined value or larger may be used to reduce the number itself of reference images and suppress the load of the calculation. When the decision rule of the pixel value C is made different depending on the attributes of the object as above, in the reference image data storing unit 256, regarding each image of the reference image, data that represents the attributes such as the material of an object represented by it is stored in association with data of the reference image.

By the mode described above, the surface shape and material of the object can be taken into account and the directivity of light based on specular reflection and so forth can be reflected in the display image more accurately. For decision of the weight coefficient, any two or more of calculation based on the shape of an object, calculation based on attributes, calculation based on the distance from the virtual camera to the reference point of view, and calculation based on the angle formed by each line-of-sight vector may be combined.

Figure 10:
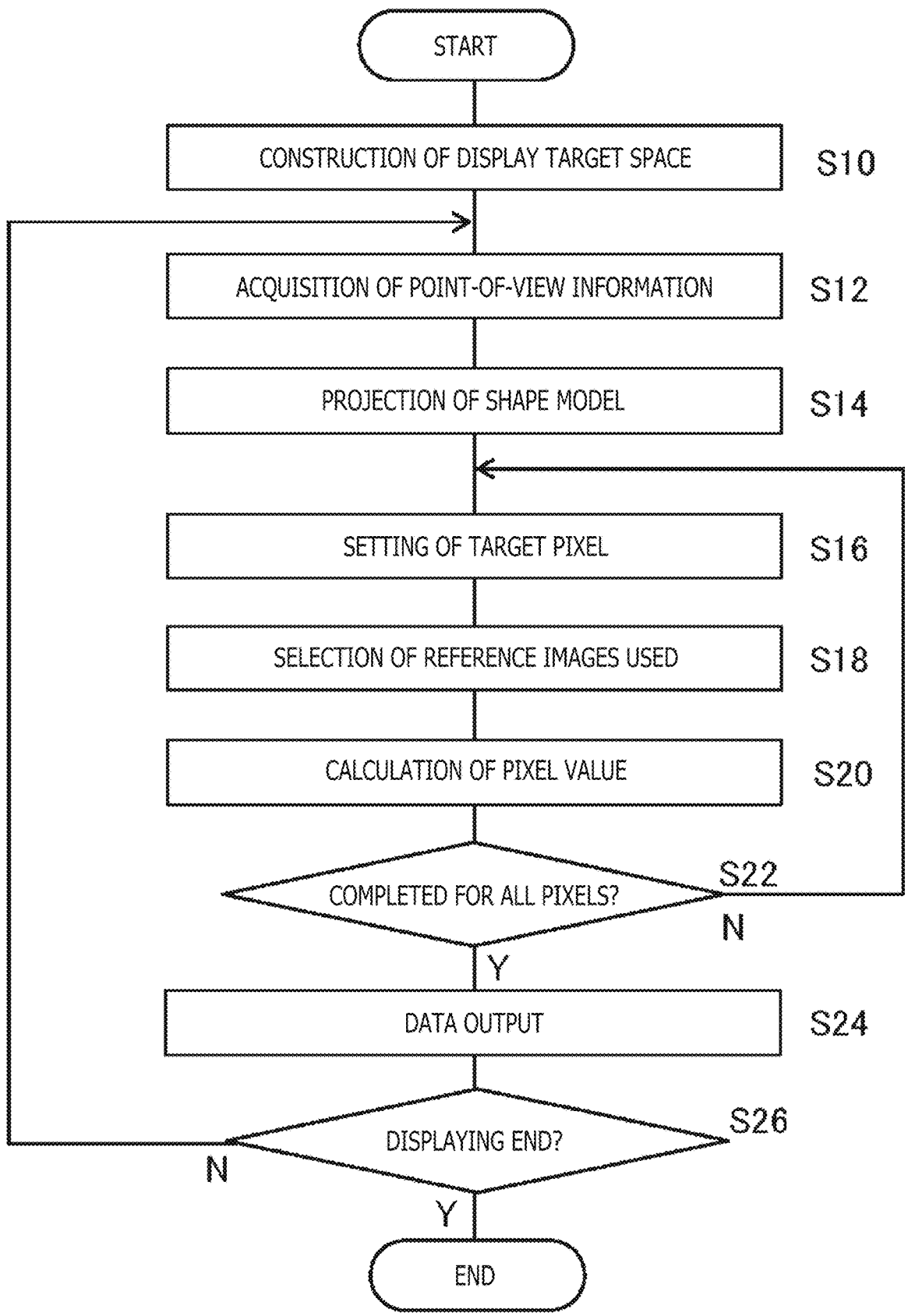
FIG. 10 is a flowchart depicting a procedure of processing in which the image generating apparatus generates the display image according to the point of view in the present embodiment.

Next, description will be made regarding operation of the image generating apparatus that can be implemented by the configuration described thus far. FIG. 10 is a flowchart depicting a procedure of processing in which the image generating apparatus 200 generates the display image according to the point of view. This flowchart is started when an application or the like is started by user operation and an initial image is displayed and the state in which the movement of the point of view is accepted is made. Various kinds of information processing such as an electronic game may be executed concurrently with display processing depicted in the diagrams as described above. First, the space constructing unit 262 constructs a three-dimensional space in which objects of display targets exist in a world coordinate system (S10).

Meanwhile, the point-of-view information acquiring unit 260 identifies the position of the point of view and the direction of the line of sight at the timing based on the position and orientation of the head of the user (S12). Next, the projecting unit 264 sets a view screen with respect to the point of view and projects objects that exist in the space of the display target (S14). As described above, in this processing, it suffices to carry out perspective transformation of vertexes of a polygon mesh that forms a three-dimensional model, for example, that is, it suffices to consider only the surface shape. Next, the pixel value deciding unit 266 sets one target pixel in the pixels inside the mesh projected in this manner (S16) and selects the reference images used for decision of the pixel value thereof (S18).

Specifically, as described above, the pixel value deciding unit 266 decides the reference images in which the point on the object represented by the target pixel appears as an image based on the depth image of each reference image. Then, the pixel value deciding unit 266 decides the weight coefficients based on the reference points of view of these reference images, the positional relationship with the virtual camera corresponding to the actual point of view, the shape and material of the object, and so forth and then carries out weighted averaging of the corresponding pixel values of the respective reference images to decide the value of the target pixel (S20). It is understood by those skilled in the art that the calculation to derive the pixel value of the target pixel from the pixel values of the reference images is variously conceivable as statistical processing or interpolation processing besides the weighted averaging.

The processing of S18 and S20 is repeated regarding all pixels on the view screen (N of S22, S16). When the pixel values of all pixels are decided (Y of S22), the output unit 268 outputs the relevant data to the head-mounted display 100 as data of the display image (S24). In the case of generating display images for the left eye and for the right eye, the processing of S16 to S22 is executed for each and the images are coupled as appropriate to be output. If there is no need to end the displaying, the next point-of-view information is acquired and then generation and output processing of the display image are repeated (N of S26, S12 to S24). When the need to end the display processing arises, all kinds of processing are ended (Y of S26).

In the example of FIG. 10, the pixel value is decided by using the reference images regarding all pixels on the view screen. However, the rendering method may be switched depending on the region on the display image and the position of the point of view. For example, only conventional texture mapping may be carried out regarding the image of the object for which change in light and the color tone due to the movement of the point of view is not necessary. Furthermore, a state observed only at a local point of view, such as reflected light with high directivity, cannot be completely expressed from reference images of the periphery in some cases. For this reason, by carrying out switching to rendering by ray tracing only when the point of view enters the relevant range, the amount of data prepared as the reference image can be suppressed.

In the configuration described above, it is effective to increase the number of reference points of view to cover various situations such as observing an object with a complex shape from a free point of view and immediately render an accurate image. On the other hand, it is conceivable that, as the reference points of view are increased, the data size of the reference image necessary for displaying becomes larger and the storage area and the transmission band are compressed and the efficiency of data reading lowers. Thus, when generating data of the reference image, the reference image generating apparatus 300 deletes data from any reference image regarding the part of an object visible from plural reference points of view in common. Thereby, suppressing increase in the data size of the reference image even when the number of reference points of view is increased is enabled.

Figure 11:
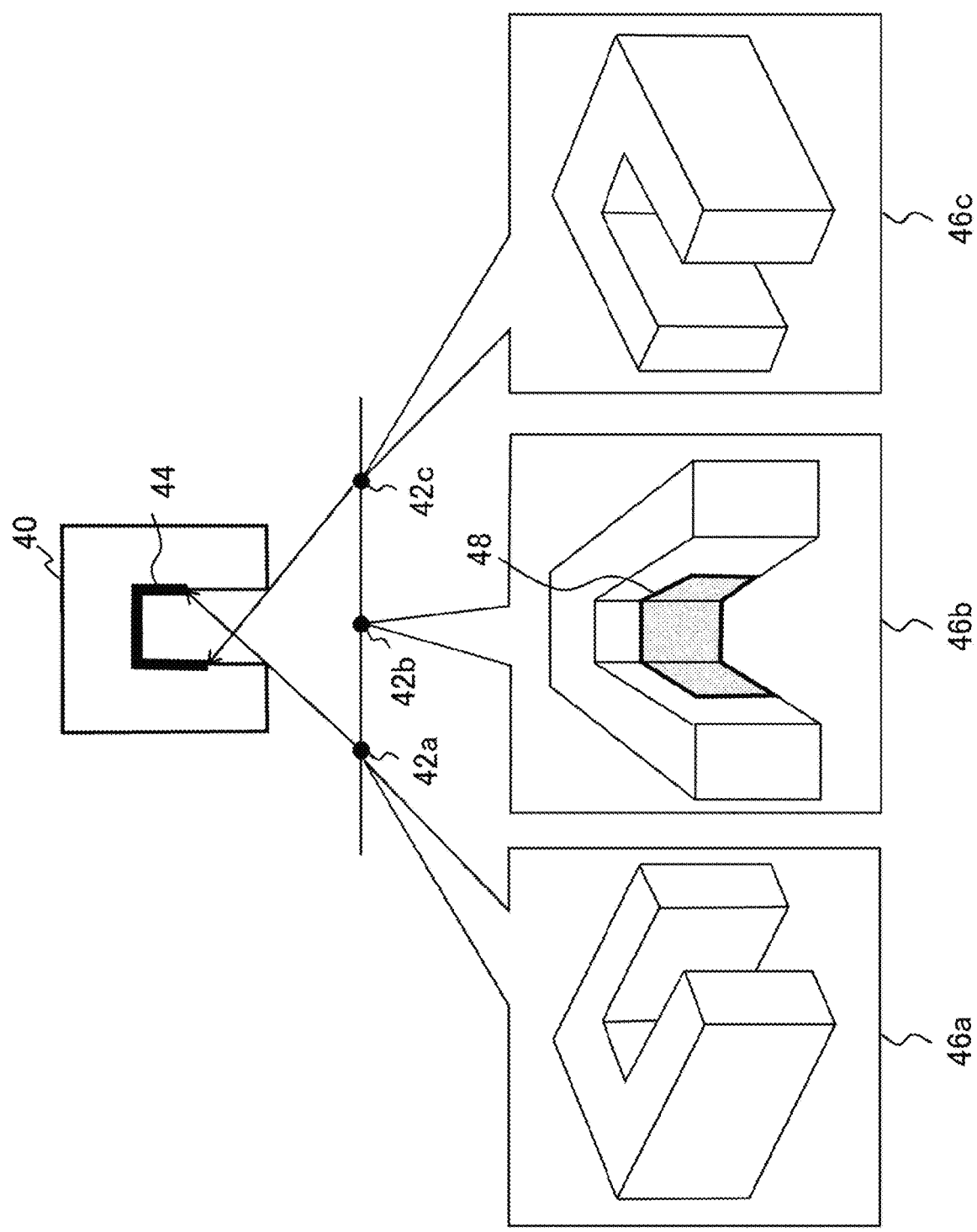
FIG. 11 is a diagram schematically depicting how an object looks from plural reference points of view in the present embodiment.

FIG. 11 schematically depicts how an object looks from plural reference points of view. The upper stage of this diagram depicts the state in which a space of a display target including an object 40 and plural reference points 42*a*, 42*b*, and 42*c* of view is overlooked. In this example, the object 40 has a recess part in the surface opposed to the array of the three reference points 42*a*, 42*b*, and 42*c* of view. In this case, inside 44 of the recess is observed from the reference point 42*b* of view, which exists in front of the opening part, whereas the inside 44 is invisible from the reference points 42*a* and 42*c* of view, which do not exist in front of it.

The lower stage of FIG. 11 depicts the part of the image of the object 40 in reference images 46*a*, 46*b*, and 46*c* obtained with respect to the respective reference points 42*a*, 42*b*, and 42*c* of view. When the height direction is considered, a hatched part 48 in the image of the object 40 is represented only in the reference image 46*b*. In other words, the part other than the part 48 is represented also in the other reference images 46*a* and 46*c*. Therefore, for example, even when data other than the hatched part 48 in the reference image 46*b* is deleted, the object 40 can be rendered if the other reference images 46*a* and 46*c* are used.

Figure 12:
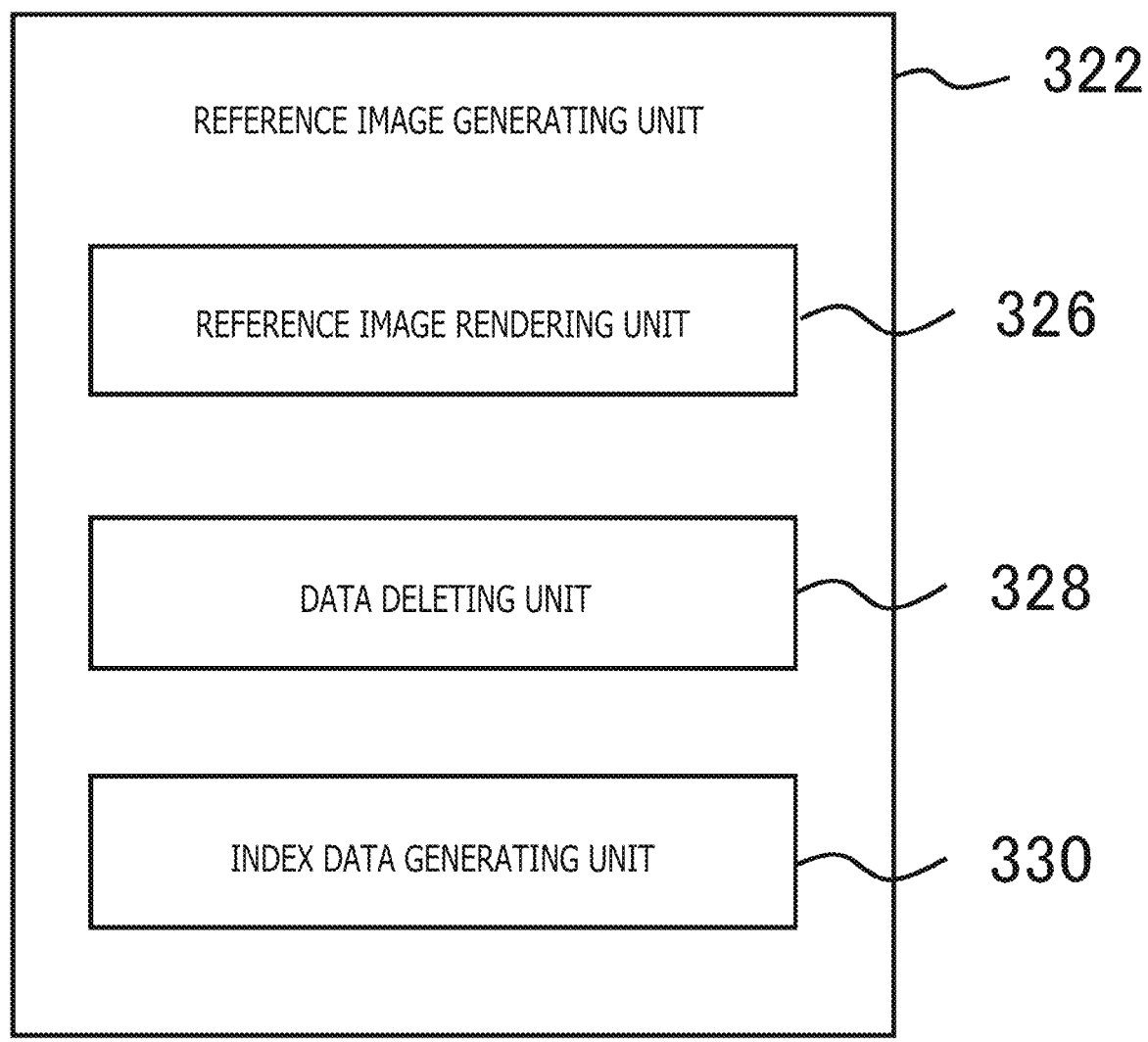
FIG. 12 is a diagram depicting a configuration of functional blocks of a reference image generating unit in a reference image generating apparatus having a function of deleting part of data of the reference image in the present embodiment.

FIG. 12 depicts a configuration of functional blocks of the reference image generating unit 322 in the reference image generating apparatus 300 having a function of deleting part of data of the reference image. The reference image generating unit 322 includes a reference image rendering unit 326, a data deleting unit 328, and an index data generating unit 330. Regarding each reference point of view set by the reference-point-of-view setting unit 310 as described above regarding FIG. 6, the reference image rendering unit 326 renders objects of display targets viewed from the reference point of view. When the same point on the same object appears in plural reference images, the data deleting unit 328 deletes data of the part from any reference image.

For example, the data deleting unit 328 deletes data of the region other than the hatched part 48 in the reference image 46*b* depicted in FIG. 11. At this time, the deletion target is decided in units of tile image obtained by dividing the image plane into predetermined sizes. This can increase the efficiency of data reading at the time of generation of the display image. The index data generating unit 330 generates, for each reference image, index data that associates identification information indicating the position coordinates or position of the tile images on the reference image with the entity of image data of each tile image. The identification information indicating that data is invalid is associated with the position coordinates of the tile image from which data has been deleted.

Figure 13:
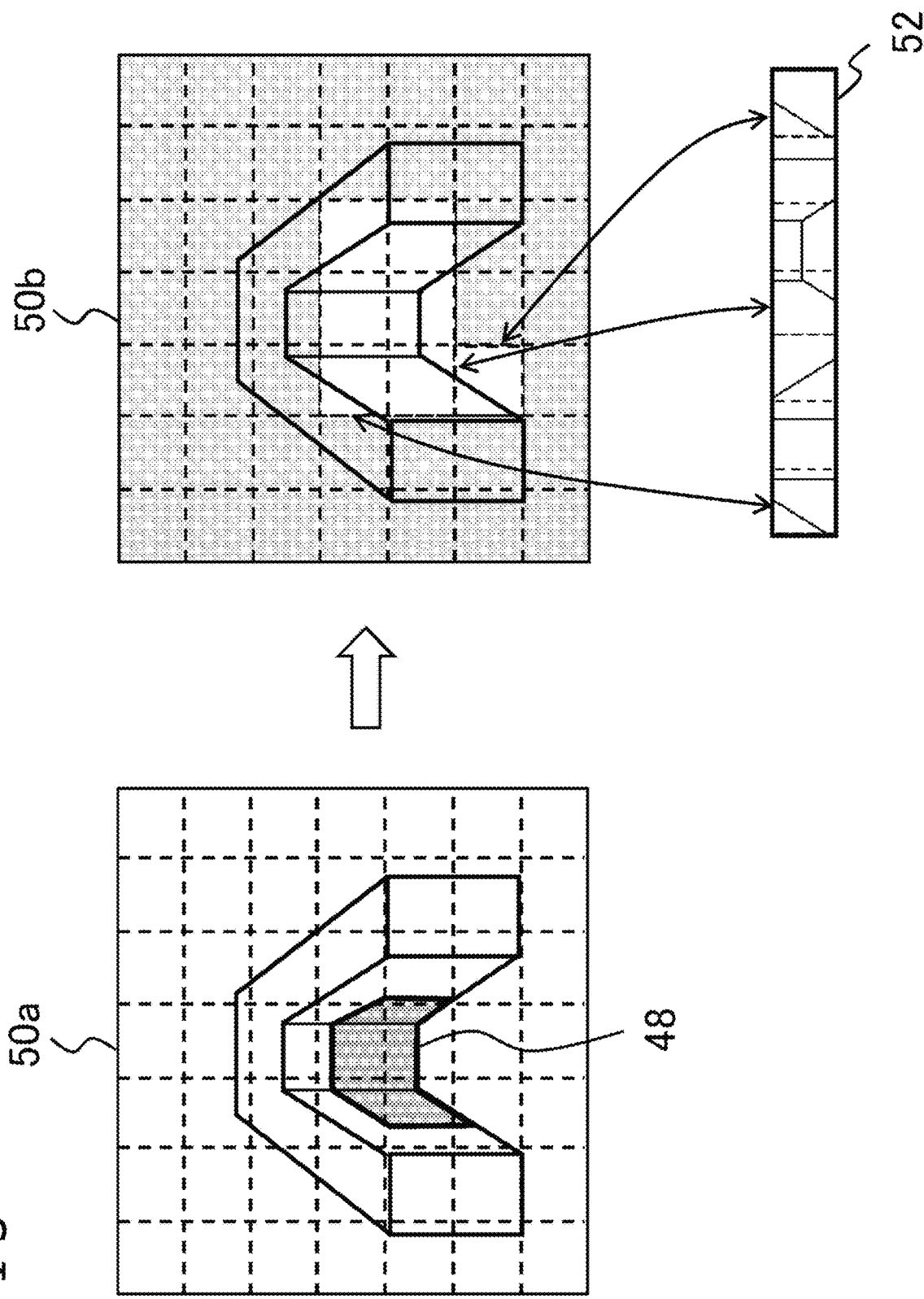
FIG. 13 is a diagram schematically depicting how partial data is deleted from a reference image in the present embodiment.

FIG. 13 schematically depicts how partial data is deleted from a reference image. First, a reference image 50*a* corresponds to the reference image 46*b* in FIG. 11. The deletion of image data is carried out in units of tile image obtained by dividing the image plane into predetermined sizes as depicted by dotted lines. In the example depicted in the diagram, the tile images including the part 48 visible only from the corresponding reference point of view are left and the other tile images are deleted. In a reference image 50*b*, the deleted tile images are depicted by hatching.

Moreover, reference image data 52 obtained by coupling only the left tile images is generated. In addition, index data that associates the position coordinates of the tile images in the plane of the original reference image with the main entity of image data is generated, and they are integrated to be employed as data of the reference image. Although three associations are schematically depicted as the index data by arrows in this diagram, actually the position coordinates on the image plane, the address of the storage area that stores the main entity of image data, and so forth may be associated for each tile image.

Due to this, through setting many reference points of view, rendering with use of the reference images is enabled also regarding an object with a complex shape and an object that overlaps with another object. In addition, increase in the data size of the reference image due to this can be suppressed. The processing of such data deletion and data shaping is executed by the reference image generating apparatus 300 together with generation of the reference images. In the data compression method described thus far, the redundancy of the reference image due to spatial closeness of the reference point of view is used. When moving image data composed of plural image frames is employed as the reference image, redundancy in terms of time can be used.

For example, particularly in the case of an object free from motion even in a moving image and an object that has a low speed although moving, even when the tile image in the previous frame is diverted, the accuracy of the display image rendered by using it can be kept. Therefore, the data deleting unit 328 may delete data from any frame regarding the tile images in which the image of the same object appears between frames of a moving image viewed from the same reference point of view. The data structure in this case may also be the same as that depicted in FIG. 13.

Figure 14:
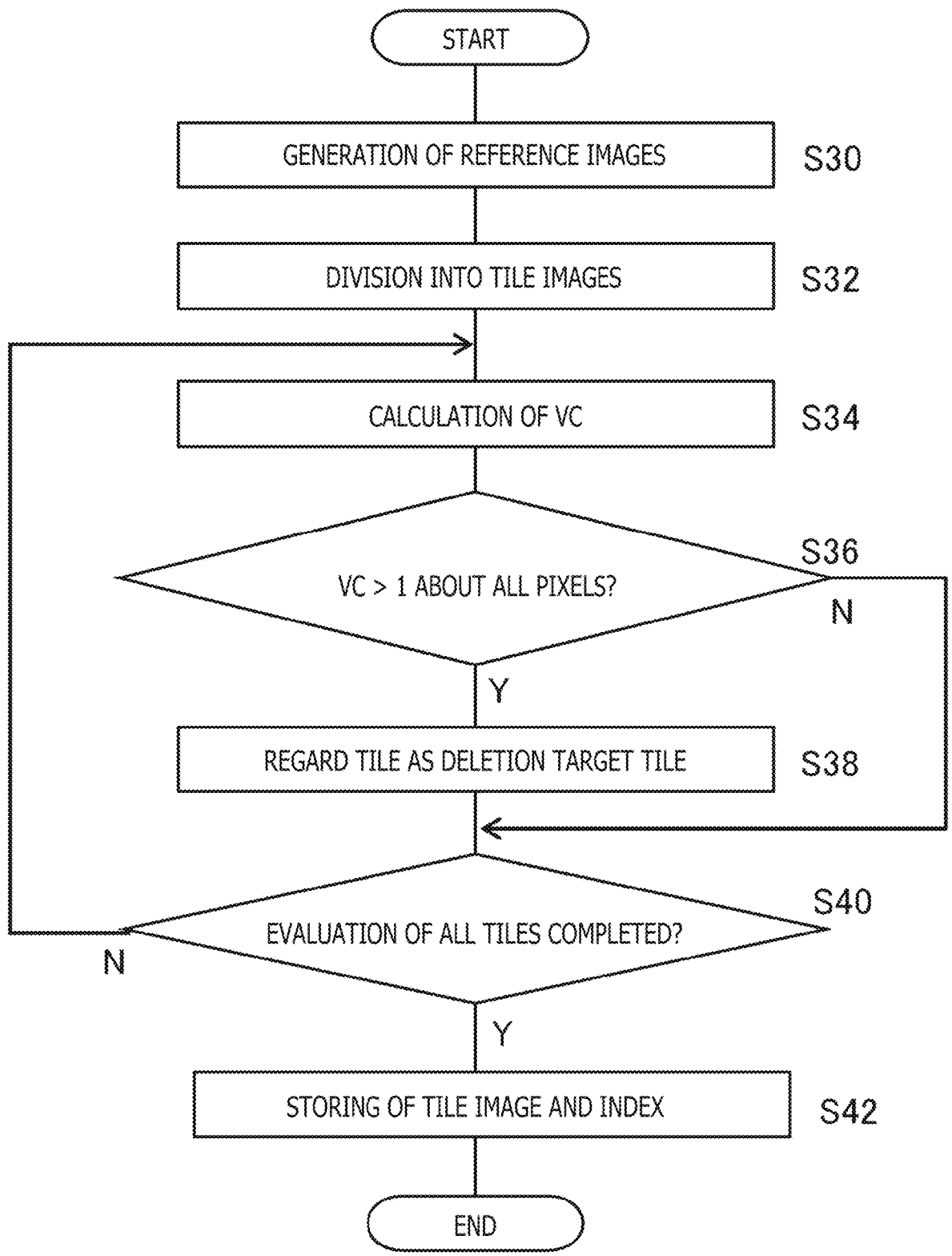
FIG. 14 is a flowchart depicting a procedure of processing in which a reference image data generating unit of the reference image generating apparatus carries out generation of reference image data including deletion of data in the present embodiment.

FIG. 14 is a flowchart depicting a procedure of processing in which the reference image data generating unit 318 of the reference image generating apparatus 300 carries out generation of reference image data including deletion of data. First, the reference image rendering unit 326 of the reference image generating unit 322 generates reference images by rendering objects viewed from reference points of view by a method such as ray tracing as described above (S30). At this time, the depth image generating unit 324 generates depth images corresponding to the respective reference points of view.

Next, the data deleting unit 328 of the reference image generating unit 322 divides each reference image into tile images with a predetermined size as depicted in the reference image 50a in FIG. 13 (S32). Next, regarding each of the pixels configuring the respective tile images, the data deleting unit 328 calculates a parameter (hereinafter, referred to as "VC (Visibility Count)") that represents from how many reference points of view a point on an object represented by the pixel is visible (S34). This processing may be similar to the processing of deciding the reference image used for decision of the pixel value of the display image in S18 of the flowchart depicted in FIG. 10.

Specifically, when the difference between the distance from each reference point of view to the point on the object and the depth value indicated by the depth image generated in association with the reference image is smaller than a threshold, it is determined that this point is visible from the reference point of view, and 1 is added to the parameter VC. Regarding the pixel that represents a point visible from only one reference point of view, VC becomes 1. Regarding the pixel that represents a point visible from plural reference points of view, VC becomes larger than 1.

Therefore, when VC of all pixels configuring the tile image is larger than 1, the image represented by this tile image can be rendered by using data of another reference image like the hatched tile images in the reference image 50b in FIG. 13 and therefore this tile image is regarded as the deletion target (Y of S36, S38). The tile image including the pixel regarding which VC is 1 is not deleted because the part of the object represented only in the reference image is included in at least part thereof (N of S36).

Such evaluation of each tile image is repeated for all tile images configuring the reference image (N of S40, S34 to S38). The processing of S34 to S38 is executed for reference images selected based on a predetermined criterion, such as the reference image of each of reference points of view at constant intervals, in the reference images generated in S30. Alternatively, VC may be calculated regarding each pixel for all reference images and the reference image regarded as the target of deletion of the tile image may be decided later. For example, the processing may be executed in such a manner that the number of deleted tile images becomes as even as possible in all reference images.

In such a case, VC of the pixel that represents the same point on an object is common to the reference images and therefore, through diverting it, the processing of S34 does not need to be executed for all pixels of all reference images. When whether or not deletion is possible has been evaluated regarding all tile images in this manner (Y of S40), the index data generating unit 330 generates index data that associates the tile images other than the deletion target with the position coordinates in the original reference image plane and stores the index data in the reference image data storing unit 320 in association with tile image data (S42).

In this case, by employing the data structure composed of tile images and index data also regarding the reference images that do not include the tile image of the deletion target, reference image data can evenly be treated irrespective of whether or not deletion exists in rendering processing. Furthermore, in the index data, identification information indicating that data is invalid is associated with the position coordinates corresponding to the tile image treated as the deletion target. By using the reference image data generated in this manner, the pixel value deciding unit 266 of the image generating apparatus 200 decides the pixel value C of the display image by the following expression.

[Math. 3]

$$C = \frac{\sum_{i}^{N} w'_i \cdot B_i \cdot V_i \cdot c_i}{\sum_{i}^{N} w'_i \cdot B_i \cdot V_i}$$ (Expression 3)

Here, similarly to expression 1 in the case in which the tile image is not deleted, the number of reference images used is defined as N and an identification number of the reference point of view is defined as i ($1 \leq i \leq N$) and the corresponding pixel value in each reference image is defined as $c_i$. Meanwhile, a weight coefficient $w'_i$ in expression 3 is a value before normalization is carried out with the sum being 1, and depends on the distance between points of view, the angle with respect to a point on an object, and so forth. Furthermore, $B_i$ is a flag that indicates 1 when the tile image including the corresponding pixel in each reference image is valid, and indicates 0 if the tile image is invalid. $B_i$ is 0 if the identification information indicating that data is invalid is associated with the position coordinates of the tile image in the index data, and is 1 in the other case.

When data of the tile image is deleted, the reference image generating unit 322 may separately create index data that associates the position of the pixel on the deleted tile image with the position of the pixel on another reference image that represents the point on the same object. When this is done, data of the pixel value is shared by plural reference images and compression is carried out as image data, whereas the pixels on all reference images have the pixel value as an entity substantially. In this case, the pixel value C can be decided by expression 1.

Such data compression utilizing the redundancy of the reference image is particularly effective in the case of a material regarding which the diffuse reflection component is dominant, with which the angle dependence of a light beam from an object is low. On the other hand, in an object or environment in which light with strong directivity arises, minute change according to the movement of the point of view can be expressed by ensuring images from as many reference points of view as possible even as reference images that represent the same object. Therefore, the reference image generating apparatus 300 may decide data of the deletion target on condition that a difference equal to or larger than a threshold does not exist in the pixel value that represents the relevant point in the respective reference images in addition to that the same point on an object is visible from plural reference points of view.

Figure 15:
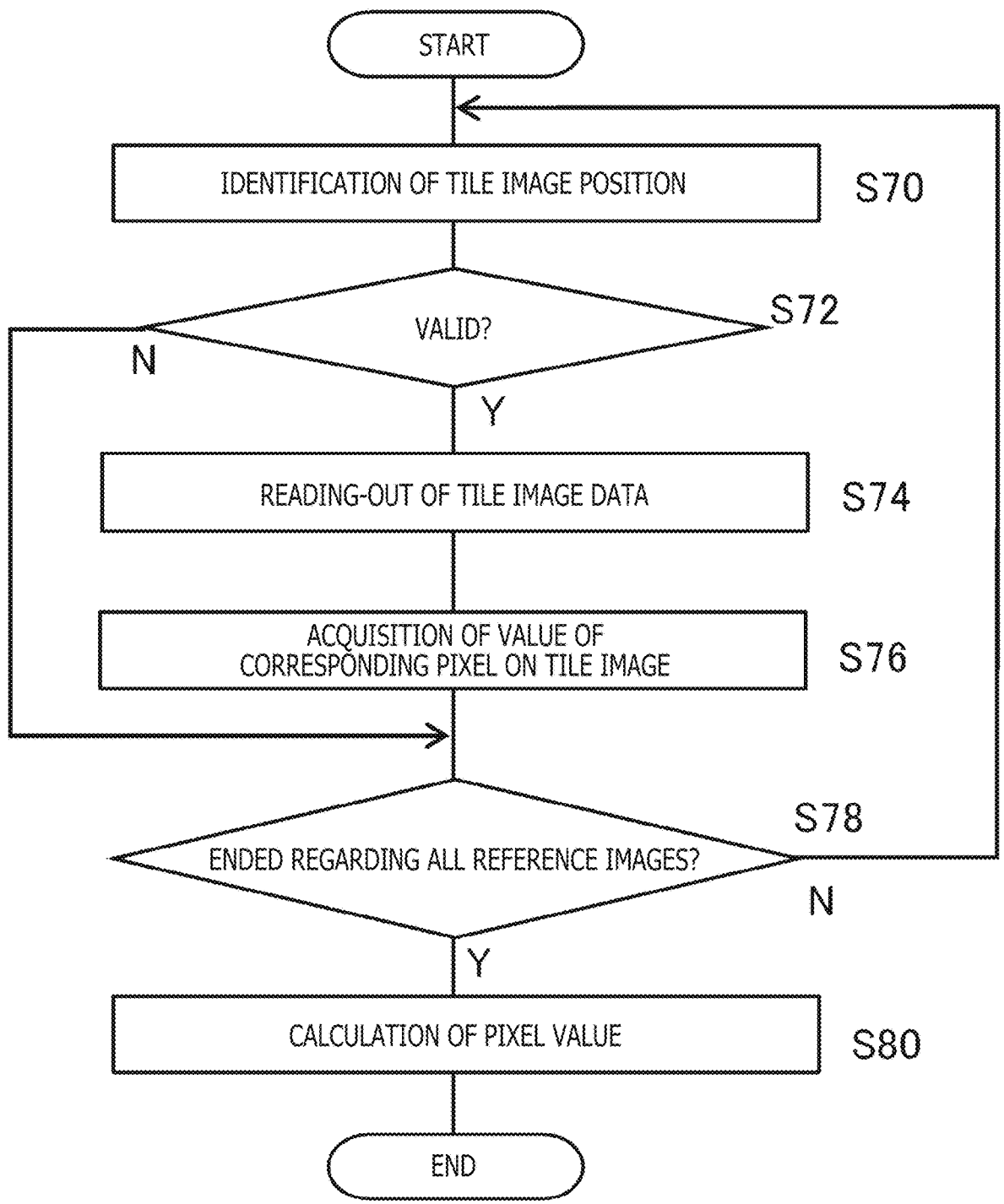
FIG. 15 is a flowchart depicting a procedure of processing in which the pixel value deciding unit of the image generating apparatus decides the pixel value by using the reference images from which partial data has been deleted in the present embodiment.

FIG. 15 is a flowchart depicting a procedure of processing in which the pixel value deciding unit 266 of the image generating apparatus 200 decides the pixel value by using the reference images from which partial data has been deleted. This processing corresponds to the processing of S20 in FIG. 10. Therefore, suppose that the reference images used for the decision of the pixel value have been found out at the previous stage. The pixel value deciding unit 266 first identifies the position of the tile image including the pixel corresponding to the target pixel on the view screen regarding one in the reference images used (S70). Then, the pixel value deciding unit 266 refers to the index data corresponding to the reference image and determines whether or not this tile image is valid (S72).

If the tile image is valid (Y of S72), that is, if the entity of data is associated with the position coordinates of the tile image, this data is read out (S74) and the value of the corresponding pixel therein is acquired (S76). If the tile image is invalid (N of S72), that is, if this tile image has been deleted from the data of the reference image, reading-out of data is not carried out. The processing of S70 to S76 is repeated regarding all reference images used (N of S78). When it is completed (Y of S78), the final pixel value is decided by calculating the weighted average of the pixel values acquired in S76 (S80).

In the above-described expression 3, $B_i=1$ is set if the determination result of S72 is valid and $B_i=0$ is set if the determination result is invalid. This is equivalent to implementing the processing procedure depicted in the diagram at a time. Furthermore, in the case of deleting the tile image based on redundancy in the time direction in frames of a moving image, when it is determined that the tile image is invalid in S72, data of the corresponding pixel in the frame previous to it may be read out to be used for calculation of the weighted average.

According to the method described thus far, the image of a free point of view can be rendered with high responsiveness by approximating the color of an object surface visible from the virtual camera corresponding to the point of view of the user by the color of the object viewed from a reference point of view close to it. On the other hand, in the situation in which the specular reflectance of the object surface is high and another object is reflected thereon, it is conceivable that a feeling of discomfort is given with only the approximation of the color from the image at the neighboring reference point of view because actually the subject of reflection and the position thereof change depending on the position of the point of view.

Figure 16:
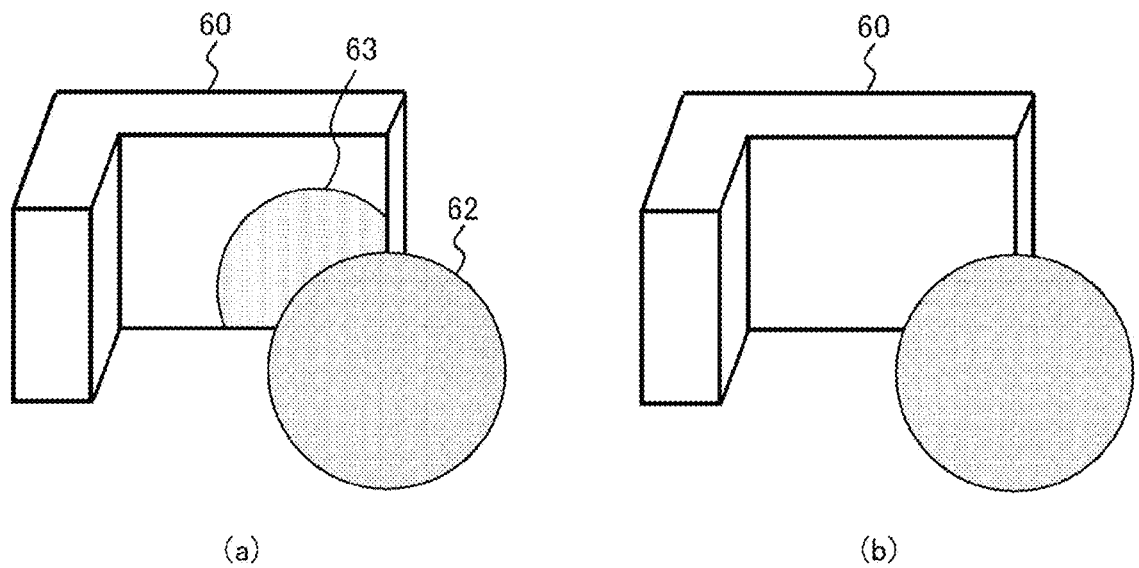
FIG. 16 depicts diagrams for explaining an image rendering method when a reflection of another object is considered in the present embodiment.

FIG. 16 depicts diagrams for explaining an image rendering method when a reflection of another object is considered. As depicted in (a) of this diagram, when an L-shaped object 60 is a material with high specular reflectance, such as a metal, an image 63 of another object 62 that exists in front of it is reflected. The image 63 moves depending on the position of the point of view actually. However, when approximation is carried out by an image viewed from a fixed reference point of view by the method described thus far, change with clear movement of the image 63 is not obtained although some change due to weighting exists, so that possibly a feeling of discomfort is given to the viewer.

Thus, as depicted in (b) of this diagram, first the state without the reflection, i.e., the pixel value that represents the original color of the object 60, is acquired. Thereafter, the color of the reflection is separately acquired and is synthesized to express the image 63 due to the reflection like that in (a) of this diagram. For rendering of the object 60 in the state without the reflection, the same method as that described thus far can be used. However, in this case, the reflection is not rendered also in prepared reference images. Furthermore, as described later, the reference image that represents the reflection of the image 63 is separately prepared depending on the method for rendering the reflection.

Figure 17:
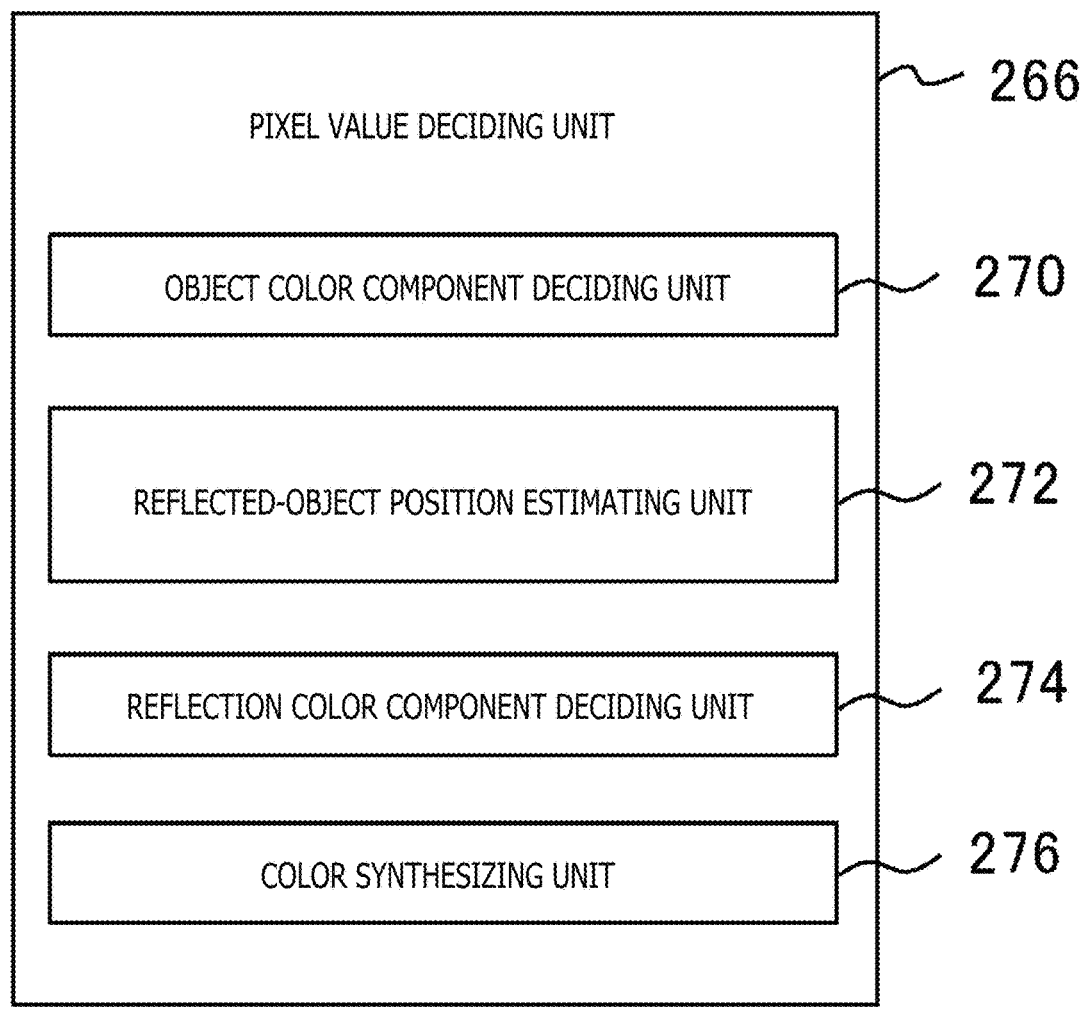
FIG. 17 is a diagram depicting a configuration of functional blocks of the pixel value deciding unit of the image generating apparatus in a mode in which a reflection on an object surface is accurately expressed in the present embodiment.

FIG. 17 depicts a configuration of functional blocks of the pixel value deciding unit 266 of the image generating apparatus 200 in a mode in which a reflection on the object surface is accurately expressed. The pixel value deciding unit 266 includes an object color component deciding unit 270, a reflected-object position estimating unit 272, a reflection color component deciding unit 274, and a color synthesizing unit 276. The object color component deciding unit 270 decides the value that represents the original color of the point on an object represented by the target pixel like the point 26 in FIG. 9. Here, the original color is information resulting from taking change in the color tone due to the state of ambient light and so forth into account, of course, and can be decided based on the reference image by the method depicted in FIG. 9.

The reflected-object position estimating unit 272 estimates the position of the rendering target in a three-dimensional space on another object reflected on the point on an object represented by the target pixel. In such a case, in the conventional technique such as ray tracing, a search for the existence of an object is made in the regular reflection direction of the line-of-sight vector from the virtual camera. In the present embodiment, position estimation with a light processing load is enabled by using the reference image or the depth image corresponding to it. A specific example will be described later.

The reflection color component deciding unit 274 identifies the pixel position at which the relevant place is represented in the reference image based on the position in the three-dimensional space on another object reflected on the target pixel. Then, the reflection color component deciding unit 274 decides the value of the color based on the reflection by referring to the pixel value of the position. The reference image used here is an image in the state without the reflection, i.e., an image in which the original color of the object is represented. Therefore, this processing is equivalent to referring to a pixel position substantially on the back side of the pixel position that should be originally referenced in the cylinder configuring the reference image.

The color synthesizing unit 276 synthesizes the original color component of the rendering target object decided by the object color component deciding unit 270 and the color component based on the reflection decided by the reflection color component deciding unit 274. For example, the color synthesizing unit 276 takes the weighted average by using a predetermined alpha value to thereby carry out alpha blending. Functions of the reflected-object position estimating unit 272, the reflection color component deciding unit 274, and the color synthesizing unit 276 may be made effective only in the situation in which a reflection of another object should be expressed, such as the case in which the specular reflectance of the object of the rendering target is equal to or higher than a threshold.

Figure 18:
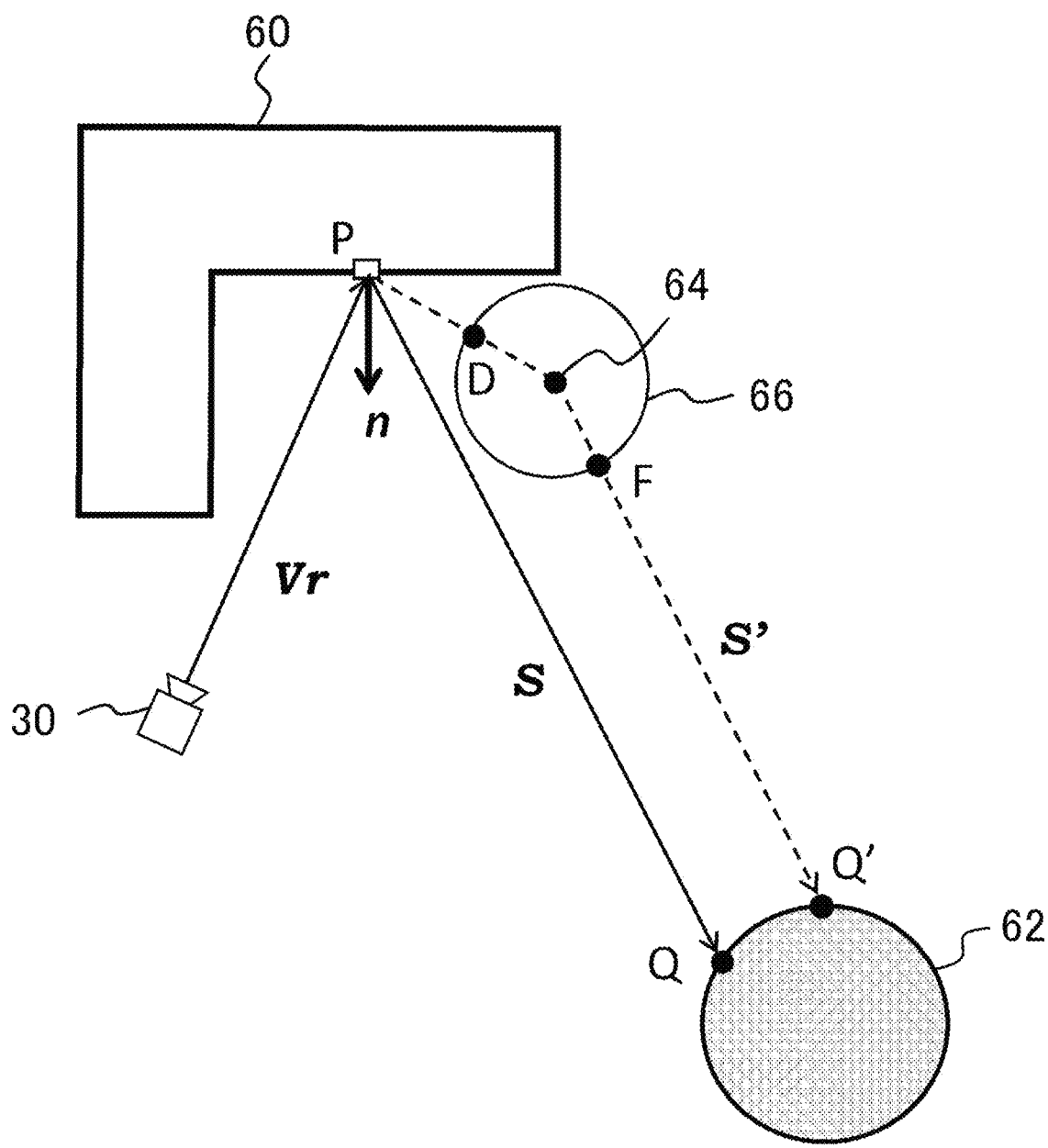
FIG. 18 is a diagram for explaining a method for deciding a reflection color component by using one reference image in the present embodiment.

Next, description will be made regarding a method in which the reflected-object position estimating unit 272 and the reflection color component deciding unit 274 identify a place on another object reflected on the object of the rendering target and acquires the color thereof from the reference image. FIG. 18 is a diagram for explaining a method for deciding the reflection color component by using one reference image. This diagram assumes the situation depicted in FIG. 16 and depicts the state in which a space of the display target including the virtual camera 30 corresponding to the point of view of a user, the object 60 of the rendering target, and the object 62 reflected on it is overlooked.

A reference point 64 of view is the reference point of view nearest to the object 60, for example, and a circle centered at it is defined as a reference image 66 in this diagram. This reference image is an image that represents the state without a reflection as described above. Therefore, for example, when the image of a point P on the object 60 is rendered, the object color component deciding unit 270 decides the original color component of the point P by using the pixel value of a point D on the reference image 66. However, in this processing, the value of the color may be obtained by weighted averaging based on expression 1 with use of plural reference images in which the point P appears as an image.

Meanwhile, the reflected-object position estimating unit 272 estimates the position of a point Q on the object 62 reflected on the point P in the three-dimensional space. As depicted in the diagram, the point Q is the point at which a vector (hereinafter, referred to as "reflection vector") S symmetric to a line-of-sight vector Vr from the virtual camera 30 in the same plane with respect to a normal vector n of the surface of the object 60 at the point P reaches the surface of the object 62. Thus, the reference point 64 of view is regarded as an initial point and the position of a point Q' at which a vector S' parallel to the reflection vector S reaches the surface of the object 62 is obtained and is regarded as an estimated position of the original point Q.

When the reference point of view is closer to the point P, the point Q' becomes closer to the point Q. Furthermore, when the object 62 is farther away from the point P, the distance between the points Q and Q' becomes a lower ratio at an ignorable degree with respect to the area of the reflection. In this case, the reflected-object position estimating unit 272 does not need to directly obtain the position coordinates of the point Q' and it suffices for the reflected-object position estimating unit 272 to obtain the reflection vector S based on the line-of-sight vector Vr and obtain the orientation of the vector S' parallel to it from the reference point 64 of view. This allows the reflection color component deciding unit 274 to identify a position F on the reference image 66 corresponding to the obtained orientation and acquire the color of the point Q'.

Figure 19:
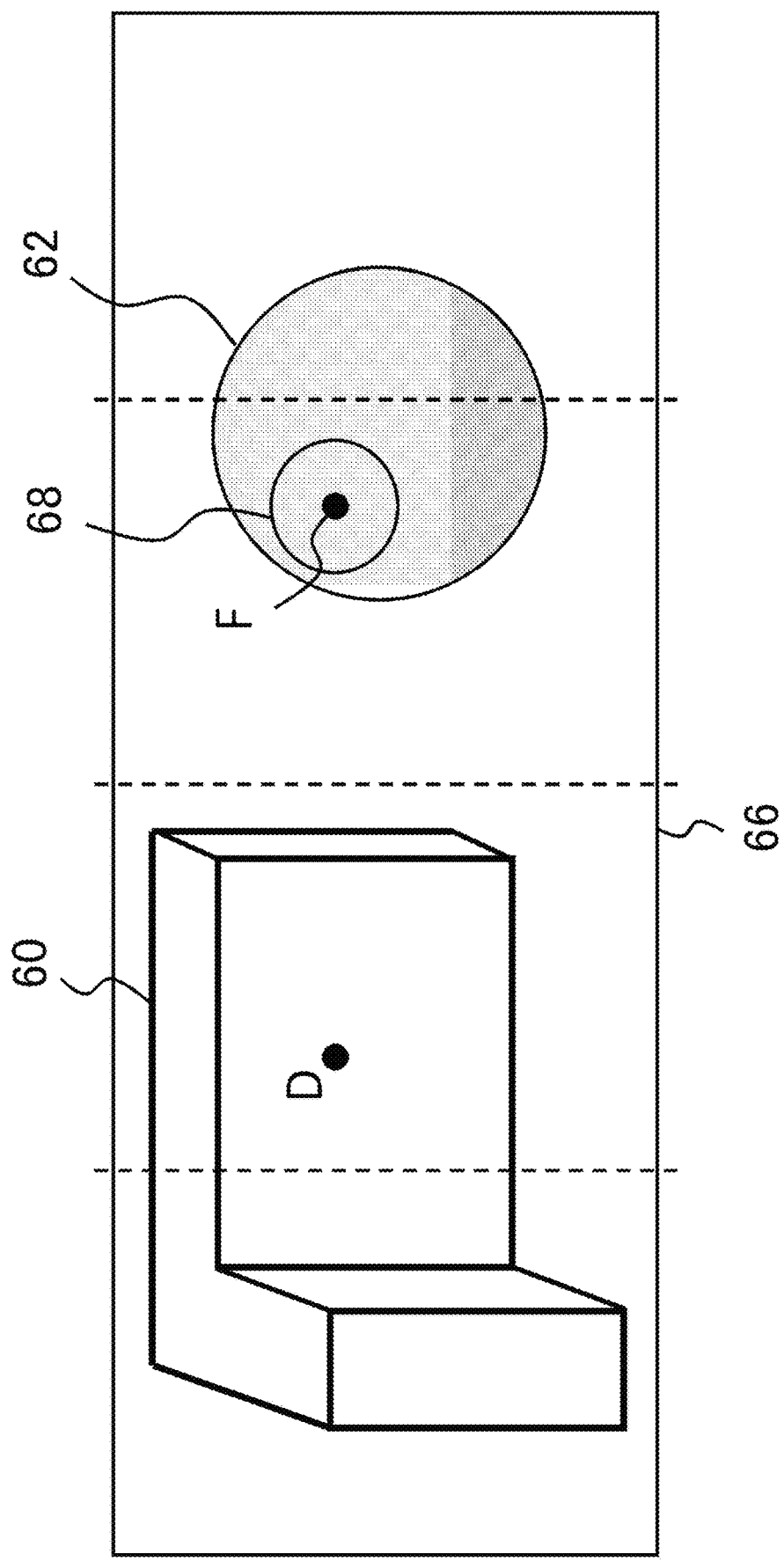
FIG. 19 is a diagram schematically depicting positions on the reference image referenced by the method depicted in FIG. 18.

FIG. 19 schematically depicts positions on the reference image referenced by the method depicted in FIG. 18. The reference image 66 is an image that represents 360 degrees orientations around the reference point 64 of view. Thus, according to the equidistant cylindrical projection, the reference image 66 can be represented by a developed view in which the vertical and horizontal positions are indicated by the latitude and longitude as depicted in the diagram. As described above, in the reference image in this mode, the reflection of the object 62 on the image of the object 60 is not represented. In the reference image 66, a position D represents the original color when the point P of the rendering target is viewed from the reference point 64 of view. Furthermore, the position F represents the color of the point Q' that can be approximated to the point Q on the object 62 that should be reflected on the point P as described with FIG. 18.

The object color component deciding unit 270 refers to the former and the reflection color component deciding unit 274 refers to the latter. Thereby, they are used for decision of the respective colors. The color synthesizing unit 276 decides the final pixel value by blending them as appropriate. The reflection color component deciding unit 274 may decide the color based on the reflection by using a color in a predetermined range 68 centered at the position F. For example, the color of the position F obtained after carrying out filtering of the color of the range 68 by a low-pass filter with a setting frequency according to surface roughness and material set regarding the object 60 may be employed as the color of the reflection component. Alternatively, a color randomly selected from the range 68 may be employed as the color of the reflection component.

This can express the reflection in an appropriately-blurred state depending on the surface state and material of the object 60. Alternatively, in order to express such a reflection, reference images may be prepared with resolutions at plural stages and the reference image to which reference is made may be switched according to the surface roughness of the object 60. In the method depicted in FIG. 18, there is no need to make a search for a position in the three-dimensional space on the surface of the object 62 and therefore the reflection according to the point of view can be expressed with a light processing load.

Figure 20:
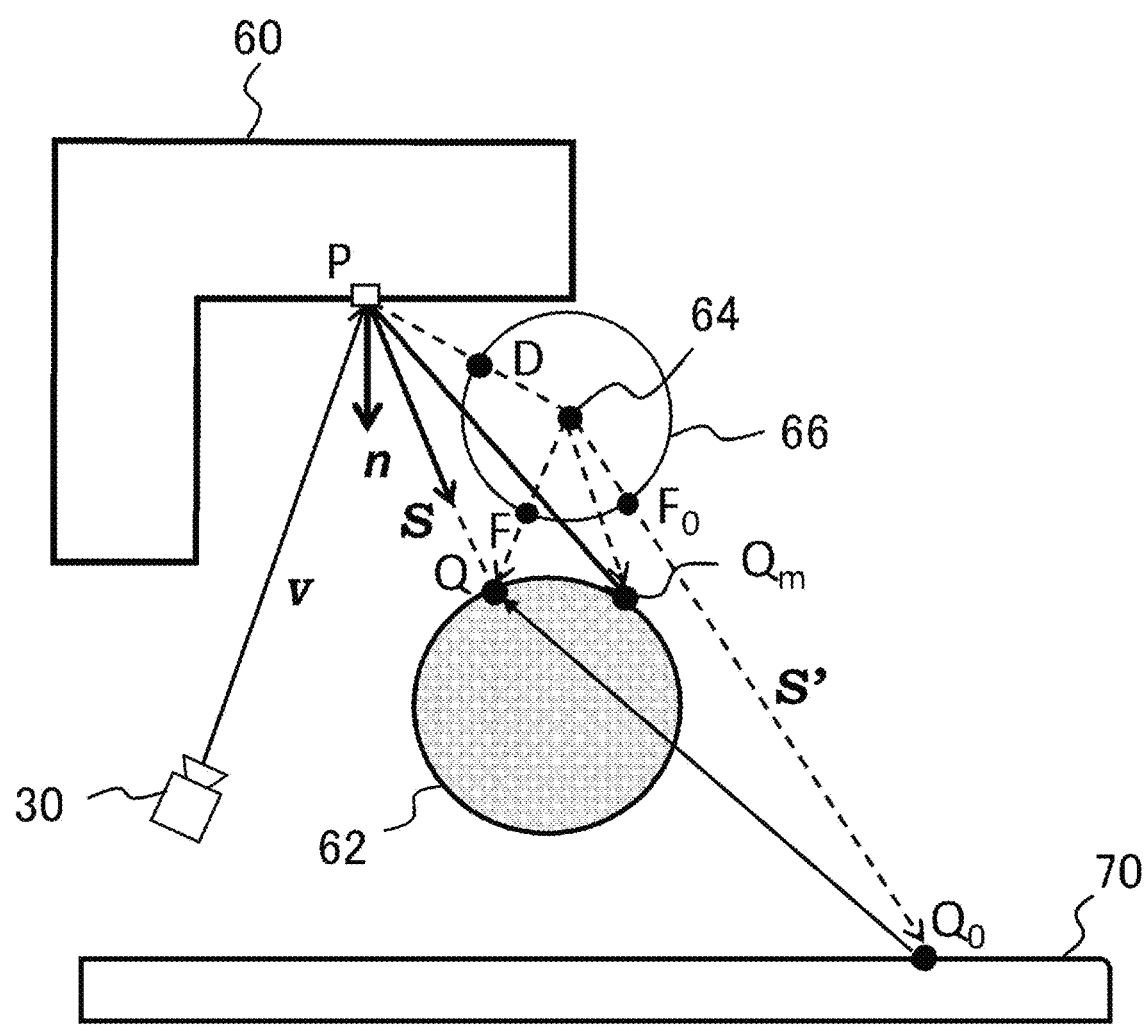
FIG. 20 is a diagram for explaining the method for deciding the reflection color component when the existence of an object at a close position is considered in the present embodiment.

On the other hand, when the object 62 exists at a position close to the point P and the reference point 64 of view, the area of the image of the object 62 reflected thereon becomes large. Therefore, the difference between the original point Q and the point Q' estimated from the reflection vector S becomes large apparently and the approximation accuracy deteriorates. FIG. 20 is a diagram for explaining the method for deciding the reflection color component when the existence of the object 62 at a position close to the point P and the reference point 64 of view is considered. Although this diagram depicts the same space as FIG. 18, the object 62 exists near the object 60 and the reference point 64 of view.

When the vector S' parallel to the reflection vector S is defined with the reference point 64 of view employed as the initial point in this example similarly to FIG. 19, the vector S' does not intersect the object 62 and reaches a point $Q_0$ on another object 70 such as the background. Using this result for decision of the color of the point P as it is results in the state in which the object 70 different from the original object is reflected. Even if the vector S' reaches the surface of the object 62, it is conceivable that the accuracy of color expression lowers due to obtainment of a pixel position far from the pixel position F that represents the original point Q on the reference image, or the like.

Figure 21:
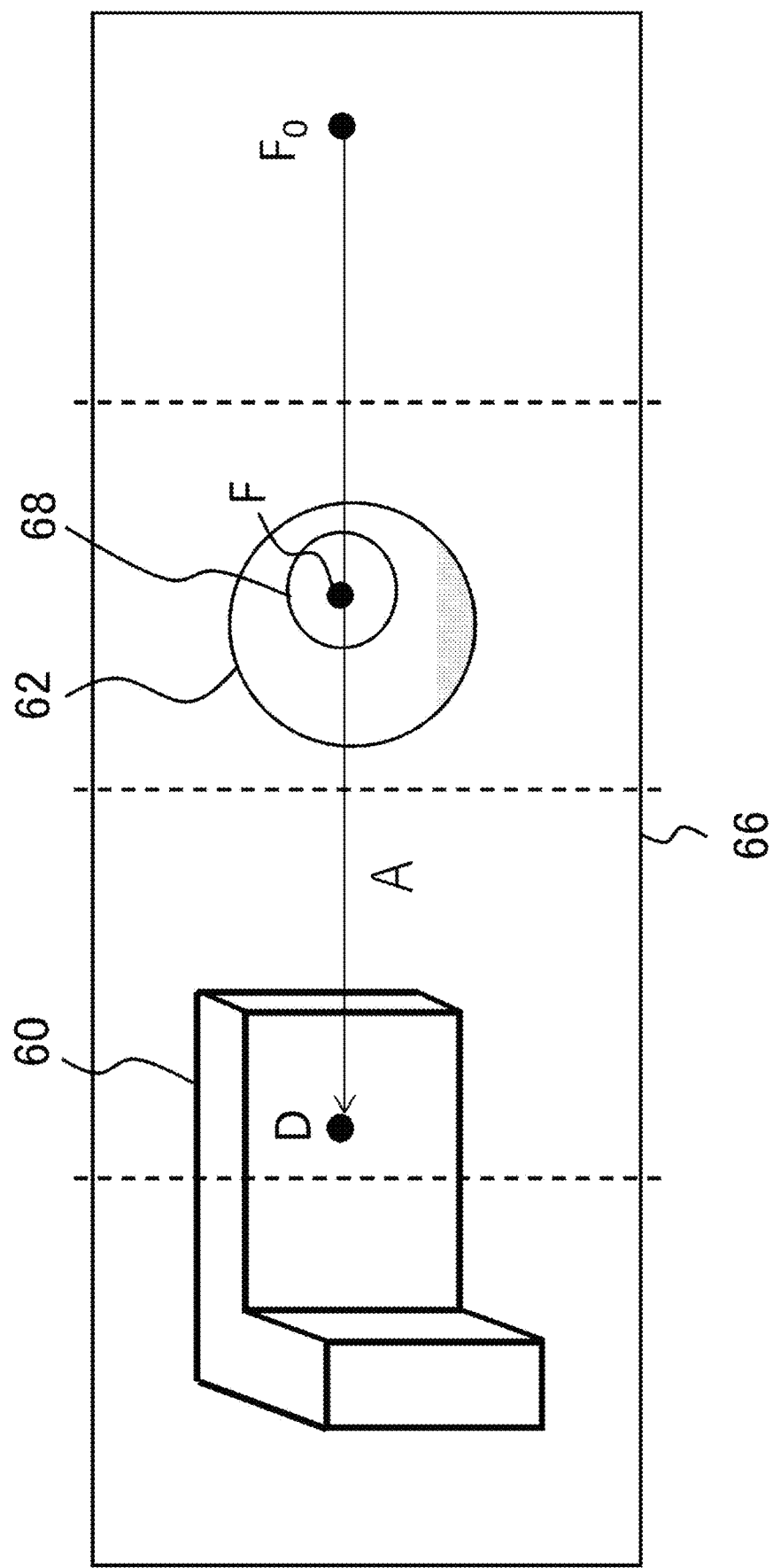
FIG. 21 is a diagram depicting how a search on the reference image is made through rotating a vector parallel to a reflection vector around the reference point of view in the present embodiment.

Thus, by rotating the orientation of the vector S' around the reference point 64 of view, a search for the orientation to reach the point Q on the object 62 reflected originally is made. FIG. 21 depicts how the search on the reference image is made through rotating the vector S' parallel to the reflection vector S around the reference point of view. In the reference image 66, the images of the object 60 and the object 62 are represented with the original colors similarly to those depicted in FIG. 19. Furthermore, the position D corresponds to the point P of the rendering target.

Moreover, a position $F_0$ corresponds to the position $Q_0$ on the object which the vector S' parallel to the reflection vector S reaches. In the example depicted in FIG. 20, the position $F_0$ exists at a place that deviates from the image of the object 62 reflected originally, i.e., on the image of the object 70 that is not depicted, such as the background. Rotating the vector S' around the reference point 64 of view is equivalent to making a search from the position $F_0$ in the direction to the position D on the reference image 66 as depicted by an arrow A.

If the orientation when the rotated vector reaches the point Q on the object 62 reflected originally is found out, a position F on the reference image 66 corresponding to it can also be identified. For this purpose, the depth image corresponding to the reference image 66 is referenced and the distance from the reference point of view to each object on the search path is acquired. In the three-dimensional space depicted in FIG. 20, the position coordinates of the reference point 64 of view are known. Therefore, when information on this distance is used, the position coordinates of a point $Q_m$ on each object surface reached when the vector S' is rotated are also found out.

Although only one point $Q_m$ is depicted in FIG. 20, actually the point $Q_m$ moves on the object surface due to the rotation of the vector S'. Here, when a vector $PQ_m$ that has the point P as the initial point and has the point $Q_m$ as the terminal point is defined, the point $Q_m$ when the angle formed by the vector $PQ_m$ and the reflection vector S becomes the smallest is the point Q originally reflected on the point P. For example, an evaluation value ε is defined as follows and the point $Q_m$ when it becomes the smallest is obtained.

[Math. 4]

$$\varepsilon = 1 - \frac{\overrightarrow{PQ_m} \cdot \vec{S}}{|\overrightarrow{PQ_m}||\vec{S}|}$$ (Expression 4)

Then, based on the orientation from the reference point 64 of view to the point Q, the position F on the reference image 66 at which the point Q appears as an image is obtained. The reflection color component deciding unit 274 decides the color based on the reflection by using the color of the position F on the reference image 66 or in the predetermined range 68 centered at it similarly to the case depicted in FIG. 19.

In the method depicted in FIGS. 20 and 21, the color based on the reflection can be obtained more accurately although the load becomes higher than in the method depicted in FIGS. 18 and 19. However, as described above, possibly the method becomes excessive processing depending on the distance of the object reflected on another object. Therefore, switching may be adaptively carried out between both methods according to the distance between objects found out when the space constructing unit 262 constructs a space of the display target, the accuracy required for displaying, and so forth.

Next, a method for deciding the reflection color component by using two reference images will be described. FIG. 22 is a diagram for explaining a problem when a display image is rendered through simply referring to two reference points of view in the case in which they are set near an object with high specular reflectance. This diagram depicts the state in which a space including objects 80, 82a, 82b, and 82c and the virtual camera 30 is overlooked.

Suppose that the object 80 is a material with high specular reflectance like a mirror, for example. Suppose that reference points 84a and 84b of view are set near the object 80 in this space. The subject reflected on the object 80 differs depending on the position of the point of view as described above. For example, the object 82c is visible from the reference point 84a of view and the object 82a is visible from the reference point 84b of view. As a result, the image of the object 82c appears in the image of the reference point 84a of view (reference image 86a) and the image of the object 82a appears in the image of the reference point 84b of view (reference image 86b).

When an image obtained by viewing the object 80 from the virtual camera 30 that exists in the middle between the reference points 84a and 84b of view is rendered by using such reference images, an image 88 obtained by overlapping the reference images 86a and 86b with each other is obtained although originally an image 90 in which the reflection of the object 82b is expressed is obtained. Furthermore, the images in the reference images are fixed. Therefore, the image of the reflection on the image obtained by synthesizing both does not move even when the virtual camera 30 moves, so that a sense of presence is impaired.

Thus, a position Q on the object 82b that appears reflected on the point P on the object 80 at the position of the virtual camera 30 like that depicted in the diagram, for example, is estimated. Then, similarly to the above-described method, positions Fa and Fb at which the position Q on the object 82b appears in the reference images of the reference points 84a and 84b of view are referenced and the color of the reflection at the point P is decided. In this method, the reference images without the reflection are generated with respect to the respective reference points 84a and 84b of view. In addition, the reference image that represents the reflection and data that represents the original position of the object that appears in it are acquired in advance.

Figure 23:
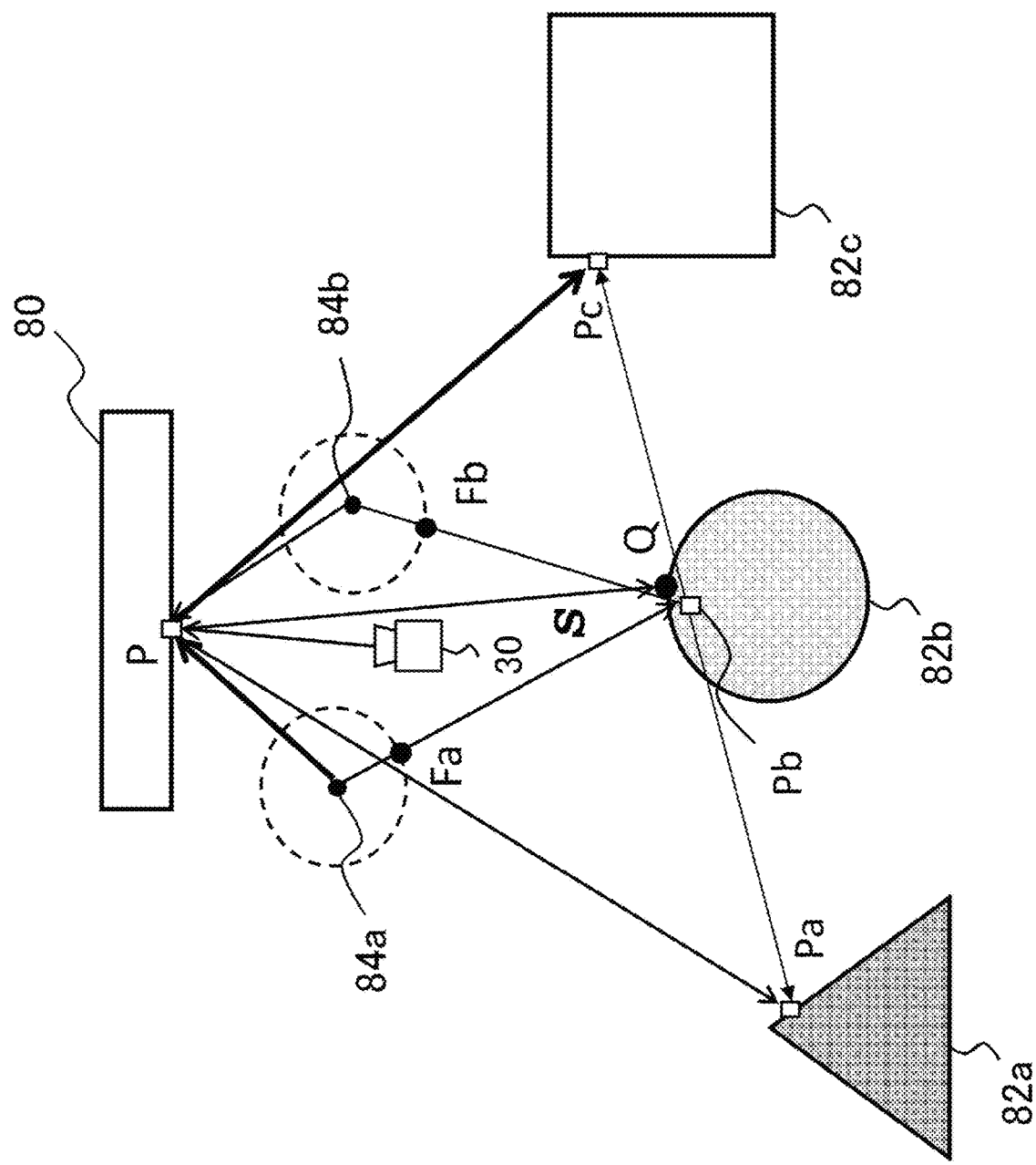
FIG. 23 is a diagram for explaining a method for estimating the point on another object that appears reflected on the object in the present embodiment.

FIG. 23 is a diagram for explaining a method for estimating the point Q on the object 82b that appears reflected on the object 80 at the position of the virtual camera 30. In a method of conventional ray tracing in which the reference image is not used, a search for the existence of an object needs to be made in the direction of the reflection vector S until the surface of the object 82b is reached. On the other hand, in the present embodiment, at the time of generation of the reference images that represent the reflection, information on the positions on the objects 82a and 82c reflected on the point P on the object 80 is acquired by a search in the regular reflection directions of the line-of-sight vectors from the respective reference points 84a and 84c of view.

For example, when the reference image of the reference point 84a of view is generated, the position of a point Pc on the object 82c is acquired by carrying out ray tracing in the direction of regular reflection of the line of sight along which the position P is viewed from this point of view as depicted by thick-line arrows. Also when the reference image of the reference point 84b of view is generated, similarly the position of a point Pa on the object 82a is acquired by carrying out ray tracing in the regular reflection direction of the line of sight along which the position P is viewed from this point of view.

When the positional relationship among the reference points 84a and 84c of view and the virtual camera 30 is considered, it turns out that the object reflected on the point P from the viewpoint of the virtual camera 30 exists in the middle between the objects 82a and 82c. This principle is used to estimate the point Q on the object 82b from the already-acquired points Pa and Pc on the objects. For example, when, as depicted in the diagram, the line-of-sight vector of the reference point 84a of view, the line-of-sight vector of the virtual camera, and the line-of-sight vector of the reference point 84b of view line up in that order from the left of the diagram, it is estimated that the points Pa, Q, and Pc on the objects reflected on the point P exist on the vectors obtained by inverting the corresponding line-of-sight vectors about the normal vector of the point P.

Thus, a point Pb that can be approximated to the point Q is obtained by the following expression, for example.

$$Pb = wa \cdot Pa + wc \cdot Pc$$ (Expression 5)

Pb, Pa, and Pc in this expression indicate the position coordinates of the respective points. Furthermore, wa and wc are weight coefficients that satisfy wa+wc=1 and are decided based on the distance between the corresponding reference point 84a or 84b of view and the virtual camera 30, for example.

At this time, as the weight coefficient by which the position (for example, position Pc) on the object that appears reflected from a certain reference point of view (for example, reference point 84a of view) is multiplied, a variable that becomes larger as the virtual camera 30 comes closer to this reference point of view and becomes 1 when the virtual camera 20 comes to the same position is employed. According to this method, the "positions" of the points on the objects reflected are synthesized based on the positional relationship among the reference points of view and the virtual camera. However, this does not intend to limit the criterion of decision of the weight coefficients thereto and another factor such as the distance from the object 80 may be taken into account.

After the point Pb that approximates the point Q on the object 82*b* that appears reflected from the virtual camera 30 is acquired in this manner, the color of the reflection on the position P is decided by using the colors of positions Fa and Fb at which the point Pb is represented or predetermined ranges centered at them in the reference images that represent the original color of the object similarly to the case depicted in FIG. 19. However, in this case, because there are two reference images of the reference destination, the weighted average of the colors is obtained by using weight coefficients or the like based on the positional relationship among the virtual camera 30 and the reference points 84*a* and 84*b* of view.

As described above, the position information of the points on the object surfaces that appear reflected from the reference points 84*a* and 84*b* of view is found out when the reference images that represent the reflection are generated. Thus, the reference image generating apparatus 300 generates the position information in association with these reference images in the same format as the depth image. This allows the image generating apparatus 200 to immediately carry out position synthesis that depends on the position of the virtual camera 30 at the time of rendering of the display image. Furthermore, although two reference images are used in the example depicted in the diagram, the color of the reflection can be decided by similar processing even when three or more reference images are used depending on the case.

Figure 24:
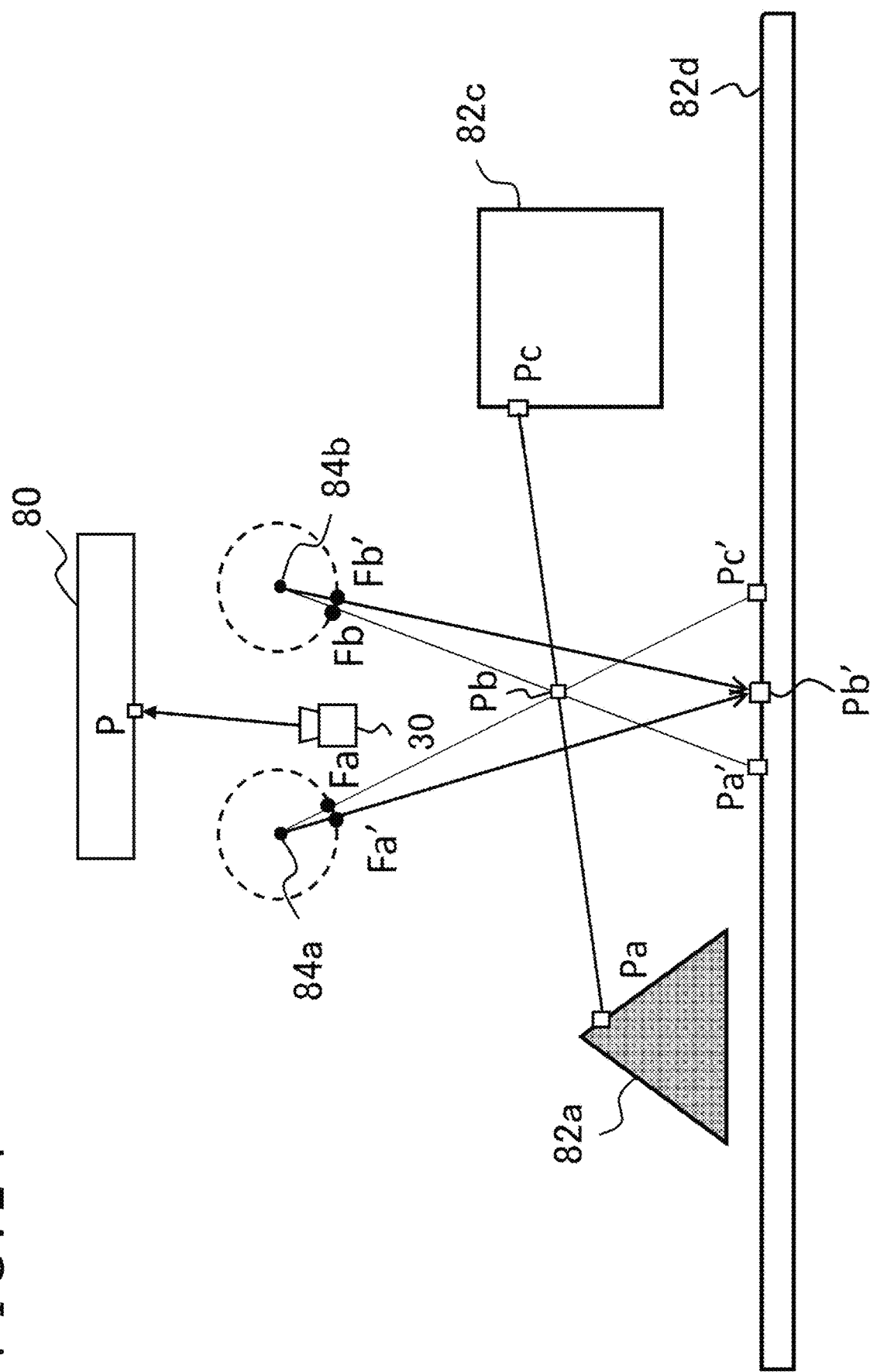
FIG. 24 is a diagram exemplifying the case in which the object that appears reflected does not exist at an estimated position in the present embodiment.

In the method depicted in FIG. 23, it is assumed that the objects 82*a*, 82*b*, and 82*c* with a possibility of being reflected on the object 80 line up on one row substantially. On the other hand, the case is conceivable in which actually the object does not exist at the point Pb obtained by one time of position synthesis based on expression 5. FIG. 24 exemplifies the case in which the object that appears reflected from the virtual camera 30 does not exist at an estimated position.

As depicted in FIG. 23, the point Pb is estimated based on the positional relationship among the virtual camera 30 and the reference points 84*a* and 84*b* of view and the points Pa and Pc on the objects 82*a* and 82*c* that appear reflected on the point P on the object 80 from the respective reference points 84*a* and 84*b* of view. Whether or not an object exists at this position is found out through comparison between the depth values of the positions Fa and Fb in the reference images of the reference points 84*a* and 84*b* of view and the position of the point Pb. For example, suppose that the depth values indicate positions Pa' and Pc' on an object 82*d* that exists on the deep side relative to the position of the point Pb as depicted in the diagram.

In this case, it is envisaged that a point Pb' on the object 82*d* appears reflected from the virtual camera 30. Thus, when the point Pb obtained by one time of estimation and the positions represented by the corresponding depth values have a difference equal to or larger than a threshold, the second round of estimation is carried out by substituting the positions Pa' and Pc' represented by these depth values for Pa and Pc in expression 5 and a new point Pb' is acquired. However, the weight coefficients wa and wb may be decided independently of the first round of calculation. Then, the color of the reflection on the position P is decided by using the colors of positions Fa' and Fb' at which the newly-obtained point Pb' is represented or the like in the reference images of the reference points 84*a* and 84*b* of view.

Figure 25:
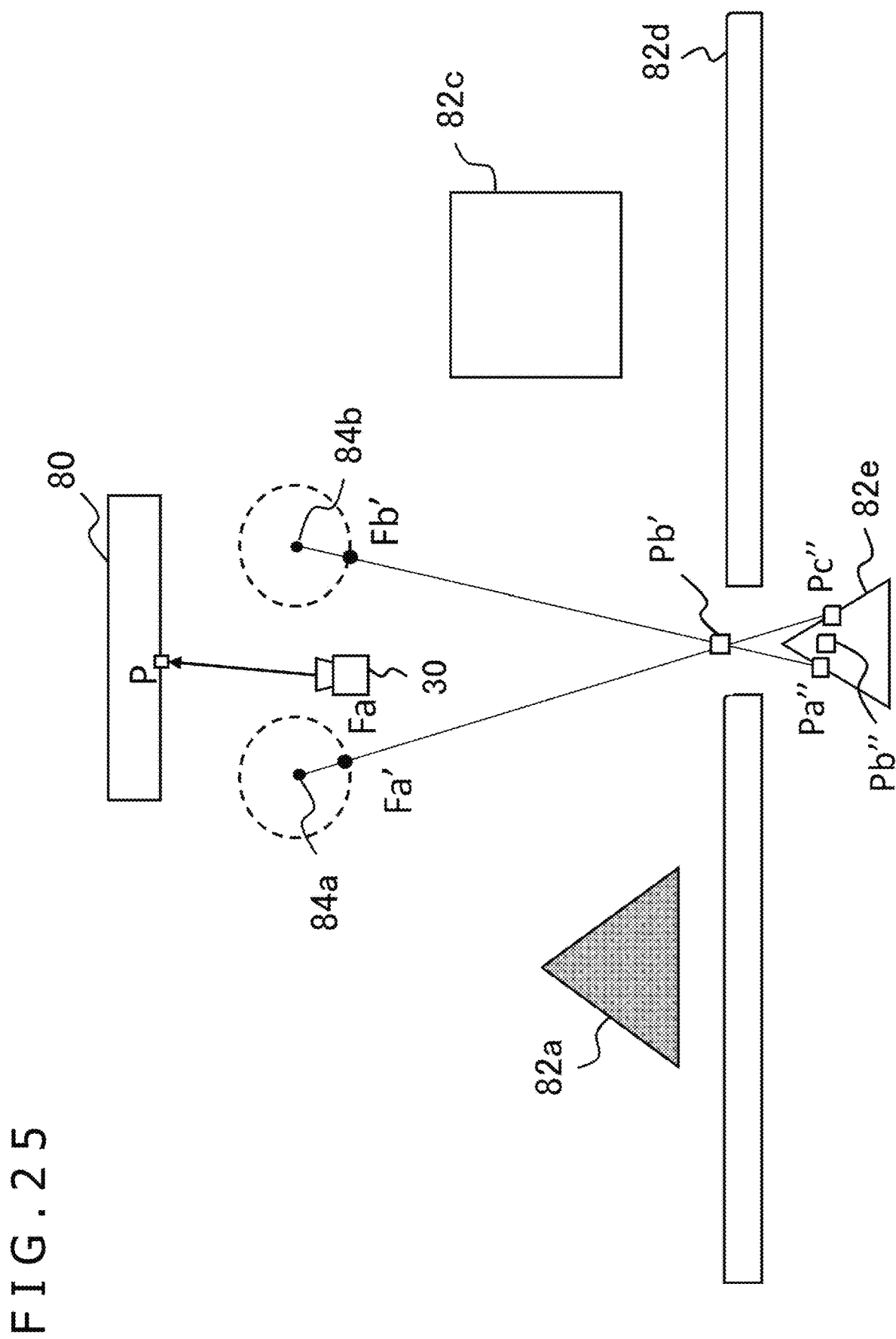
FIG. 25 is a diagram exemplifying the case in which the object that appears reflected does not exist at the position obtained by the second round of estimation in the present embodiment.

Meanwhile, there is also the case in which an object still does not exist also at the position of the newly-obtained point Pb'. FIG. 25 exemplifies the case in which the object that appears reflected from the virtual camera 30 does not exist at the position obtained by the second round of estimation. Also in this case, by comparison between the position of the point Pb' and the depth values at the positions Fa' and Fb' in the reference images of the reference points 84*a* and 84*b* of view, it turns out that an object does not exist at this position and an object 82*e* exists on the deeper side thereof. Thus, the third round of estimation is carried out by substituting the positions Pa" and Pc" obtained from the depth values for Pa and Pc in expression 5 and a new point Pb" is acquired. Thereby, the color of the reflection on the position P is decided by using the colors of the corresponding positions on the reference images.

By repeating the calculation of the position estimation in this manner, a search for the reflected object can easily be made in a comparatively-wide range. However, it is conceivable that, when the distance to the reflected object becomes long due to the repetition of the estimation processing, change in the image in response to the movement of the virtual camera 30 becomes small and strict calculation becomes unnecessary. Therefore, an upper limit may be set for the number of times of repetition of the estimation processing. In this case, the color may be decided through directly synthesizing the colors of the positions Pa" and Pc" obtained from the depth values of the reference images, or the like, or the method may be switched to another method such as ray marching, which is a general search method.

Figure 26:
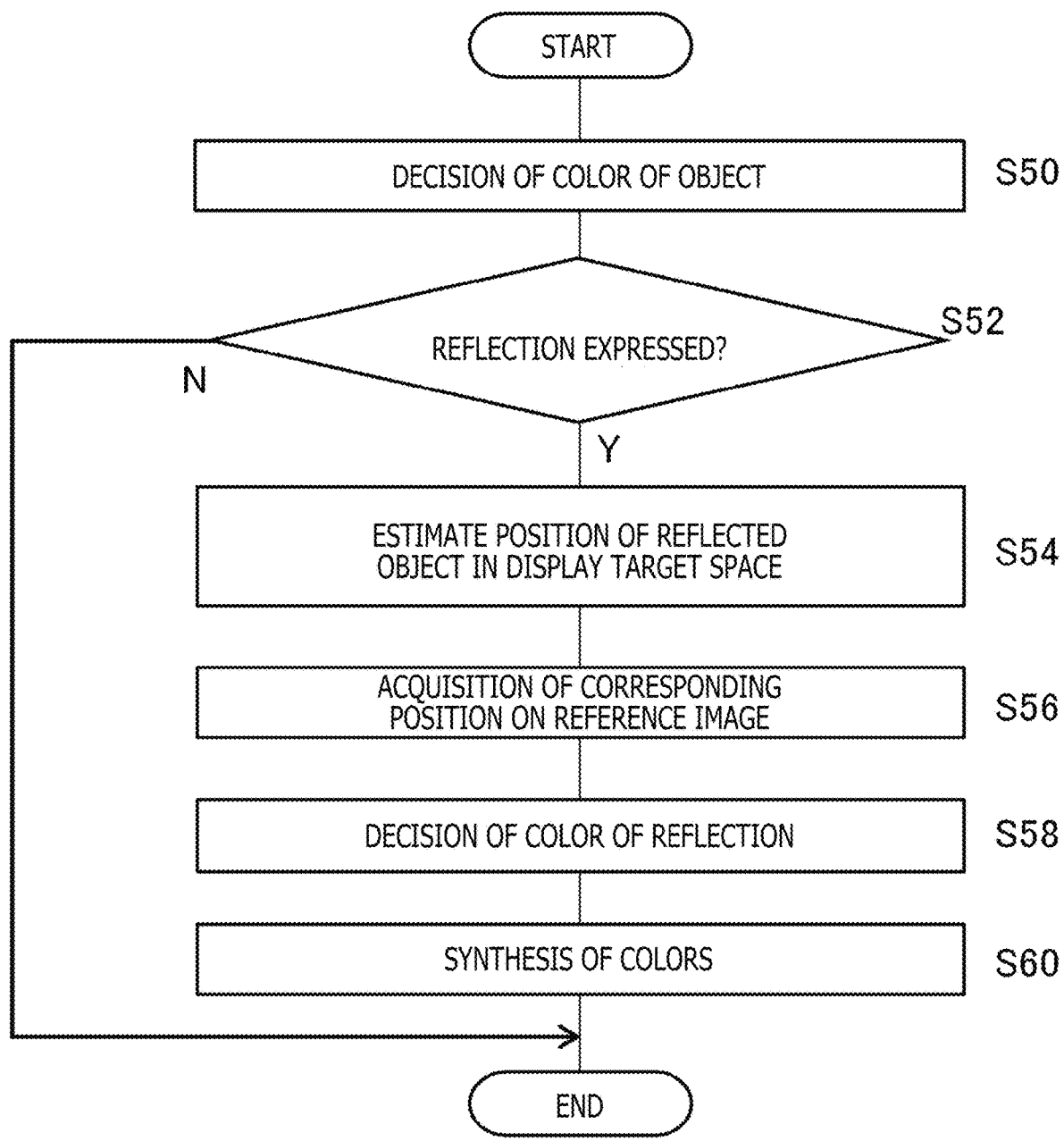
FIG. 26 is a flowchart depicting a procedure of processing in which the pixel value deciding unit of the image generating apparatus decides the pixel value in consideration of the reflection in the present embodiment.

FIG. 26 is a flowchart depicting a procedure of processing in which the pixel value deciding unit 266 of the image generating apparatus 200 decides the pixel value in consideration of the reflection. This flowchart can be substituted for the processing of S20 in FIG. 10 and is executed for each target pixel. First, the object color component deciding unit 270 decides the value that represents the color of an object itself by using a reference image in the state without a reflection (S50). This processing is the same as the processing of S20 in FIG. 10. By this, the base color for which the state of light, the material of the object, and so forth are taken into account is obtained.

When the target pixel is a pixel at which a reflection does not have to be expressed, such as a pixel at which the specular reflectance is lower than a threshold, the processing is ended without operation (N of S52). When a reflection is expressed (Y of S52), the reflected-object position estimating unit 272 estimates the position in the space of the display target regarding the point on the object reflected on the target pixel according to the point of view of the virtual camera 30 based on the position and orientation of the head of the user (S54). Specifically, as depicted in FIGS. 18 to 21, an approximating point is decided by using a vector that is parallel to the reflection vector of the virtual camera 30 and has a reference point of view as the initial point, or a search is made based on the depth value of the reference image while this vector is rotated.

Alternatively, as depicted in FIGS. 22 to 25, the positions of reflected points obtained when plural reference images are generated are synthesized based on the positional relationship among the virtual camera and the reference points of view. Then, the reflection color component deciding unit 274 acquires the pixel position on the reference image corresponding to the estimated position (S56) and decides the color component of the reflection by using the color of this pixel position or a predetermined range centered at it (S58). The color synthesizing unit 276 synthesizes the original color of the object decided in S50 and the color based on the reflection decided in S58 to decide the final pixel value (S60).

According to the present embodiment described above, in the technique for displaying an image from a freely selected point of view, data of images with respect to reference points of view set in advance are prepared. Then, at the time of rendering of a display image, the pixel value of the display image is decided by acquiring the value of the pixel that represents the same object from the prepared reference images. For the calculation of the pixel value, the rule based on the positional relationship among the actual point of view and the reference points of view and attributes of the object is introduced. The reference images can be generated over time at a different timing from displaying according to the point of view and therefore images with high quality can be prepared. At the time of displaying, an image with high quality can be presented without taking a long time by drawing values from the images with high quality.

Furthermore, by utilizing the fact that the possibility that the same part on an object appears in the reference images regarding which the reference points of view are close is high, data of such an overlapping part is deleted from the reference images. This can compress the data size of the reference images and increase the reference points of view without increasing the data size. As a result, even when the configuration of the space of the display target or the object shape becomes complicated, both the accuracy of the display image and the lightness of the rendering processing including handling of image data and so forth can be achieved.

Moreover, in order to express a reflection of another object on an object with high specular reflectance, the separately-acquired color corresponding to the reflection is synthesized with the color decided by using the reference image in the state without the reflection. The image at the original position of the reflected object is also represented in this reference image and therefore the color corresponding to the reflection is decided with reference to the image. The original position of the reflected object, which is necessary at the time, is also acquired by using various kinds of information obtained when reference images are generated. Due to this, an image with a sense of presence in which the reflection also moves according to the movement of the point of view can be expressed with a remarkably-light load compared with conventional techniques such as ray tracing.

The description is made above based on the embodiment of the present invention. The embodiment is exemplification and it is understood by those skilled in the art that various modification examples are possible regarding combinations of the respective constituent elements and the respective processing processes of the embodiment and such modification examples also fall within the scope of the present invention.

For example, in the present embodiment, after the original color of an object is decided as the base temporarily, the color of a reflection due to another object is synthesized. In this case, the part in which the image of the reflected object is represented in the same reference image is referenced. On the other hand, by employing an separately-prepared image as the image referenced for decision of the synthesized color, an image other than the reflection can freely be synthesized. For example, when a moving image in which an object moves is prepared as the image of the reference destination, the state in which part of objects is moving can be expressed even if the image as the base is a still image. The size of the image data necessary in this case becomes remarkably small compared with the case in which reference images are all prepared as moving images.

REFERENCE SIGNS LIST

100 Head-mounted display, 200 Image generating apparatus, 222 CPU, 224 GPU, 226 Main memory, 236 Output unit, 238 Input unit, 254 Object model storing unit, 256 Reference image data storing unit, 260 Point-of-view information acquiring unit, 262 Space constructing unit, 264 Projecting unit, 266 Pixel value deciding unit, 268 Output unit, 270 Object color component deciding unit, 272 Reflected-object position estimating unit, 274 Reflection color component deciding unit, 276 Color synthesizing unit, 300 Reference image generating apparatus, 310 Reference-point-of-view setting unit, 314 Object model storing unit, 316 Space constructing unit, 318 Reference image data generating unit, 320 Reference image data storing unit, 322 Reference image generating unit, 324 Depth image generating unit, 326 Reference image rendering unit, 328 Data deleting unit, 330 Index data generating unit.

INDUSTRIAL APPLICABILITY

As described above, the present invention can be used for various kinds of information processing apparatuses such as a head-mounted display, a game machine, an image display apparatus, a portable terminal, and a personal computer and an information processing system including any of them, and so forth.

The invention claimed is:

1. An image generating apparatus comprising:
a reference image data storing unit that stores data of a reference image from a plurality of reference images that represents an image when a space including an object of a display target is viewed from a predetermined reference point of view,
wherein a first subset of the plurality of reference images have a reference point of view set at a height of eyes when a user stands and a second subset of the plurality of reference images have a reference point of view set at a height of eyes when the user sits,
wherein the reference point of views of the first subset and the reference point of views of the second subset do not overlap in an X-axis direction or a Y-axis direction;
a point-of-view information acquiring unit that acquires information relating to a point of view;
a projecting unit that represents a position and a shape of an image of the object when the space is viewed from the point of view on a plane of a display image;
a pixel value deciding unit that decides a value of a pixel configuring the image of the object in the display image by using a value of a pixel that represents a same image in the reference image; and
an output unit that outputs data of the display image, wherein
the reference image data storing unit stores data of a reference image including an invalid region that does not have data of an image in a field of view from a corresponding reference point of view, and the pixel value deciding unit selects the reference image in which a same image appears in a valid region when deciding the value of the pixel configuring the image of the object, wherein the reference image data storing unit stores, as data of the reference image, data of a tile image obtained by dividing the reference image by predetermined sizes and index data that associates a position of the tile image on an image plane with the data of the tile image, wherein the pixel value deciding unit acquires the value of the pixel by referring to a tile image including a pixel that represents a same image in the reference image based on the index data, and wherein the index data is generated prior to the point-of-view information acquiring unit acquiring the information related to the point of view.

2. The image generating apparatus according to claim 1, wherein the invalid region is set in units of the tile image and the index data associates identification information indicating that data is invalid with a position corresponding to a tile image of the invalid region, and the pixel value deciding unit refers to the index data and selects a reference image in which a tile image including the pixel that represents the same image is valid in the reference images.

3. The image generating apparatus according to claim 1, wherein the reference image data storing unit stores data of a plurality of the reference images in which the invalid region is set with ensuring of appearance of images of all objects in the space of the display target in at least one reference image.

4. The image generating apparatus according to claim 1, wherein the reference image data storing unit stores data of a reference image including the invalid region and a reference image that does not include the invalid region and the reference image including the invalid region is decided based on a position of the corresponding reference point of view.

5. The image generating apparatus according to claim 1, wherein the reference image data storing unit stores data of a reference image composed of a plurality of moving image frames and the data is composed of data of frames including the invalid region and frames that do not include the invalid region.

6. An image generating method for generating a display image that represents a space including an object of a display target, the image generating method comprising:

acquiring information relating to a point of view;

representing a position and a shape of an image of the object when the space is viewed from the point of view on a plane of the display image;

reading out data of a reference image from a plurality of reference images that represents an image when the space is viewed from a predetermined reference point of view from a memory that stores the data of the reference image, and deciding a value of a pixel configuring an image of the object in the display image by using a value of a pixel that represents a same image in the reference image, wherein a first subset of the plurality of reference images have a reference point of view set at a height of eyes when a user stands and a second subset of the plurality of reference images have a reference point of view set at a height of eyes when the user sits, and wherein the reference point of views of the first subset and the reference point of views of the second subset do not overlap in an X-axis direction or a Y-axis direction; and outputting data of the display image, wherein the memory stores data of a reference image including an invalid region that does not have data of an image in a field of view from a corresponding reference point of view, and the deciding the value of the pixel configuring the image of the object selects the reference image in which a same image appears in a valid region, wherein memory stores, as data of the reference image, data of a tile image obtained by dividing the reference image by predetermined sizes and index data that associates a position of the tile image on an image plane with the data of the tile image, and the pixel value deciding unit acquires the value of the pixel by referring to a tile image including a pixel that represents a same image in the reference image based on the index data, wherein the index data is generated prior to the point-of-view information acquiring unit acquiring the information related to the point of view.

7. A non-transitory computer readable medium having stored thereon a computer program for a computer that generates a display image that represents a space including an object of a display target, comprising:

a reference image data storing unit that stores data of a reference image from a plurality of reference images that represents an image when a space including an object of a display target is viewed from a predetermined reference point of view, wherein a first subset of the plurality of reference images have a reference point of view set at a height of eyes when a user stands and a second subset of the plurality of reference images have a reference point of view set at a height of eyes when the user sits, wherein the reference point of views of the first subset and the reference point of views of the second subset do not overlap in an X-axis direction or a Y-axis direction;

by a point-of-view information acquiring unit, acquiring information relating to a point of view;

by a projecting unit, representing a position and a shape of an image of the object when the space is viewed from the point of view on a plane of the display image;

by a pixel value deciding unit, reading out data of a reference image from the reference image data storing unit that represents an image when the space is viewed from a predetermined reference point of view from a memory that stores the data of the reference image, and deciding a value of a pixel configuring an image of the object in the display image by using a value of a pixel that represents a same image in the reference image; and by an output unit, outputting data of the display image; wherein the memory stores data of a reference image including an invalid region that does not have data of an image in a field of view from a corresponding reference point of view, and the deciding the value of the pixel configuring the image of the object selects the reference image in which a same image appears in a valid region, wherein the reference image data storing unit stores, as data of the reference image, data of a tile image obtained by dividing the reference image by predetermined sizes and index data that associates a position of the tile image on an image plane with the data of the tile image, and the pixel value deciding unit acquires the value of the pixel by referring to a tile image including a pixel that represents a same image in the reference image based on the index data, wherein the index data is generated prior to the point-of-view information acquiring unit acquiring the information related to the point of view.

* * * * *